United States Patent
Naito et al.

(10) Patent No.: US 8,364,388 B2
(45) Date of Patent: Jan. 29, 2013

(54) TRAVELING GUIDANCE SYSTEM, TRAVELING GUIDANCE METHOD, AND COMPUTER PROGRAM

(75) Inventors: Takashi Naito, Anjo (JP); Daisuke Muko, Anjo (JP); Takashi Hayashi, Anjo (JP)

(73) Assignee: Aisin AW Co., Ltd., Anjo-shi, Aichi-ken (JP)

( * ) Notice: Subject to any disclaimer, the term of this patent is extended or adjusted under 35 U.S.C. 154(b) by 407 days.

(21) Appl. No.: 12/603,780

(22) Filed: Oct. 22, 2009

(65) Prior Publication Data

US 2010/0106401 A1    Apr. 29, 2010

(30) Foreign Application Priority Data

Oct. 28, 2008    (JP) ................. 2008-276315

(51) Int. Cl.
*G01C 21/00*    (2006.01)
(52) U.S. Cl. ...................................... 701/201
(58) Field of Classification Search .................. 701/201
See application file for complete search history.

(56) References Cited

U.S. PATENT DOCUMENTS

| | | | |
|---|---|---|---|
| 5,539,399 A | 7/1996 | Takahira et al. | |
| 5,790,976 A | 8/1998 | Boll et al. | |
| 5,815,824 A * | 9/1998 | Saga et al. | 701/22 |
| 2002/0171390 A1* | 11/2002 | Kruger et al. | 320/103 |

FOREIGN PATENT DOCUMENTS

| | | |
|---|---|---|
| JP | 2001-057711 | 2/2001 |
| JP | 2001-57711 A | 2/2001 |
| JP | 2003-021522 | 1/2003 |
| JP | 2003-21522 A | 1/2003 |
| JP | 2003-102110 | 4/2003 |
| JP | 2003-102110 A | 4/2003 |
| JP | 2005-238969 | 9/2005 |
| JP | 2005-238969 A | 9/2005 |

OTHER PUBLICATIONS

Notification of Reason(s) for Refusal for Japanese Patent Application No. 2008-276315 dated Jul. 20, 2012, with translation.
Japanese Office Action in corresponding Japanese Application No. 2008-276315, dated Jul. 24, 2012 with English translation.

* cited by examiner

*Primary Examiner* — Thomas Tarcza
*Assistant Examiner* — Maceeh Anwari
(74) *Attorney, Agent, or Firm* — Bacon & Thomas, PLLC

(57) ABSTRACT

A travel guidance system for a vehicle having a plurality of on-board batteries includes: a travel start location obtaining unit; a destination obtaining unit; a charging facility candidate location obtaining unit for obtaining location information for charging facility candidates; a remaining amount calculating unit for calculating, for each charging facility candidate, the amount of energy which will remain in the on-board batteries upon arrival at the charging facility candidate; a charging facility selecting unit for selecting a charging facility suitable for leaving the on-board batteries based on the travel start location, the destination, the location information for charging facility candidates, and the amounts of the remaining energy in the on-board batteries calculated for each charging facility candidate; and a charging facility notification unit for communicating the location information for the selected charging facility.

9 Claims, 14 Drawing Sheets

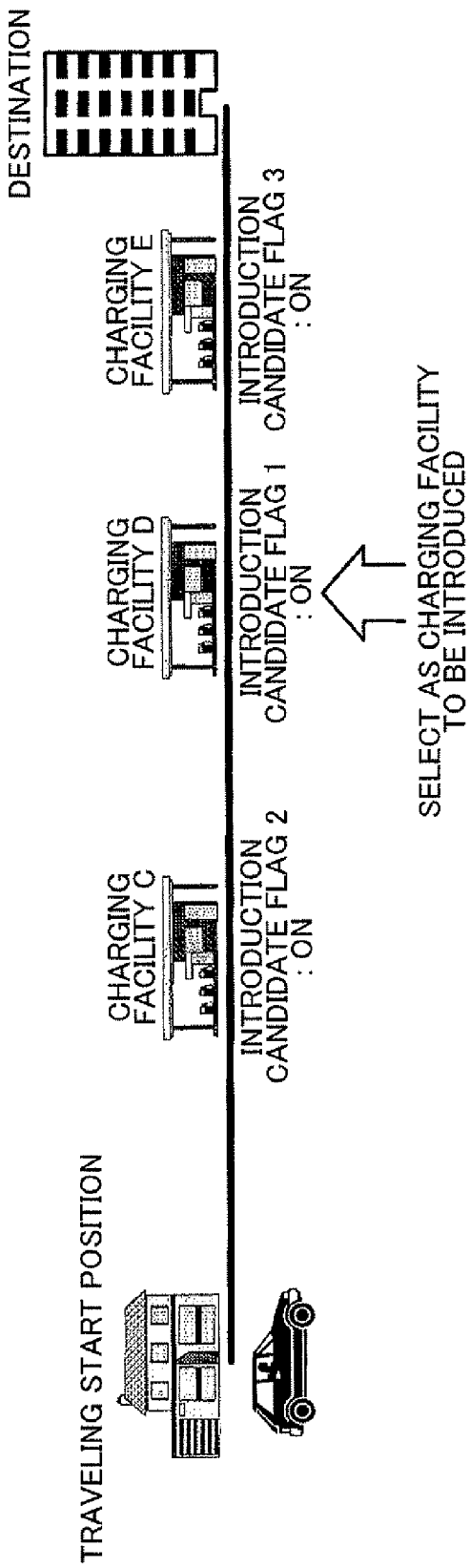

TRAVELING GUIDANCE SYSTEM, TRAVELING GUIDANCE METHOD, AND COMPUTER PROGRAM

INCORPORATION BY REFERENCE

The disclosure of Japanese Patent Application No. 2008-276315 filed on Oct. 28, 2008 including the specification, drawings and abstract is incorporated herein by reference in its entirety.

BACKGROUND OF THE INVENTION

The present invention relates to a travel guidance system, a travel guidance method, and a computer program for locating a charging facility for charging on-board batteries of an electric, battery powered vehicle.

DESCRIPTION OF THE RELATED ART

Conventionally, when the driver of a vehicle looks at the fuel gauge when traveling and notices that the remaining fuel is low, the driver drives to a gas station he or she remembers, to fuel the vehicle. Further, when using a navigation system, it is possible to detect the vehicle location with the navigation system even in an area unfamiliar to the driver, and then nearby fueling facilities are displayed on the navigation screen, so that the driver can find the location of the nearest gas station by referring to the displayed navigation screen.

However, in the case of a vehicle using a motor which is driven by power supplied from a battery as a drive source, the navigation system should locate not only a battery charging facility in the vicinity of the vehicle, but the located charging facility should provide efficient charging. For example, Japanese Patent Application Publication No. H10-170293 (see pp. 5 to pp. 7, FIG. 3) describes a system which identifies, out of plural charging facilities located on a guidance route to a destination, a charging facility providing charging whereby the required number of times of recharging will be minimum and the amount of charging becomes even for the rechargings.

SUMMARY OF THE INVENTION

In operation of a vehicle using a motor running on electricity supplied from a battery as the drive source, the charging time required for recharging the battery is quite long as compared to the fueling time of a gasoline-powered vehicle. Therefore, there is a problem that, when the driver stops at a charging facility to charge the battery, interrupting travel to the destination, the time of arrival at the destination becomes later.

On the other hand, in recent years it has been proposed to extend the cruising distance by mounting a plurality of batteries in a vehicle and switching batteries when stopping at a charging facility. However, when a plurality of batteries are mounted in a vehicle, it has been difficult to determine an appropriate charging schedule for efficient recharging.

The present invention solves the above-described problems, by providing a travel guidance system, a travel guidance method, and a computer program which are capable of notifying the driver of a vehicle having a plurality of batteries, of the charging facility which is most suitable for leaving a battery for recharging, thereby allowing efficient recharging.

With a travel guidance system according to a first aspect of the present invention, by adopting a new charging method to leave and request recharging of an on-board battery at a charging facility, and notifying the driver of the most suitable charging facility for leaving an on-board battery, it becomes possible to perform efficient recharging for a vehicle having a plurality of on-board batteries. For example, the waiting time for charging a battery at the charging facility can be reduced.

With a travel guidance system according to the first aspect, it becomes possible to notify the driver of the charging facility that makes it possible to complete round-trip travel from the charging facility to a destination and back to the charging facility with one of the on-board batteries, which is not left at the charging facility, as a power supply source.

Further, with a travel guidance system according to the first aspect, an on-board battery no longer used as a power source for the vehicle is identified as the on-board battery to be left at the charging facility.

Further, with a travel guidance system according to the first aspect, since the charging facility for requesting charging is selected from among charging facilities located on a guidance route from the travel start location to the destination, the driver is notified of a charging facility where one of the on-board batteries can be left without deviating from the guidance route.

Further, by adopting a travel guidance method according to a second aspect, to leave and request recharging of an on-board battery at a charging facility, and notifying the driver of the most suitable charging facility as a place to leave the on-board battery, it becomes possible to perform efficient recharging for a vehicle having a plurality of on-board batteries. For example, the waiting time for recharging a battery at the charging facility can be reduced.

Moreover, with a computer program according to a third aspect, by adopting the new charging method to leave and request charging of an on-board battery at a charging facility, and causing a computer to notify the driver of the most suitable charging facility as a place to leave the on-board battery, it becomes possible to perform efficient recharging for a vehicle having a plurality of on-board batteries. For example, the waiting time for recharging a battery at the charging facility can be reduced.

BRIEF DESCRIPTION OF THE DRAWINGS

FIG. 9 is a diagram describing an example of vehicle operation using a charging facility for which a candidate flag 1 is set to ON;

FIG. 10 is a diagram describing another example of vehicle operation using a charging facility candidate for which a candidate flag 1 is set to ON;

FIG. 11 is a diagram describing an example of vehicle operation using a charging facility for which a candidate flag 2 is set to ON;

FIG. 12 is a diagram describing an example of vehicle operation using a charging facility for which a candidate flag 3 is set to ON;

FIG. 14 is a diagram illustrating another example of selection of a charging facility from among plural charging facility candidates.

DETAILED DESCRIPTION OF THE EMBODIMENTS

Figure 1:
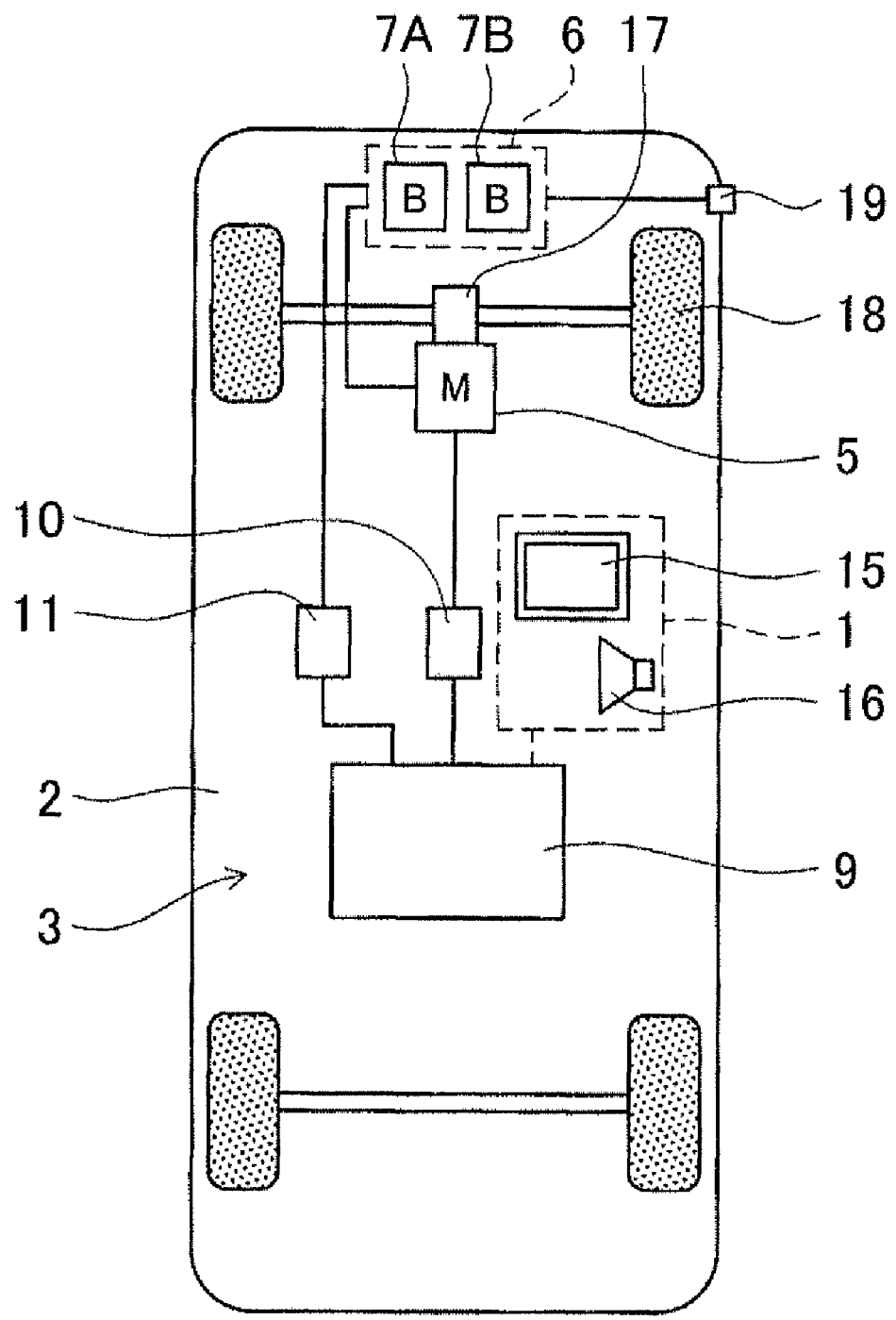
FIG. 1 is a schematic structural diagram of a vehicle control system according to an embodiment of the present invention.
Figure 2:
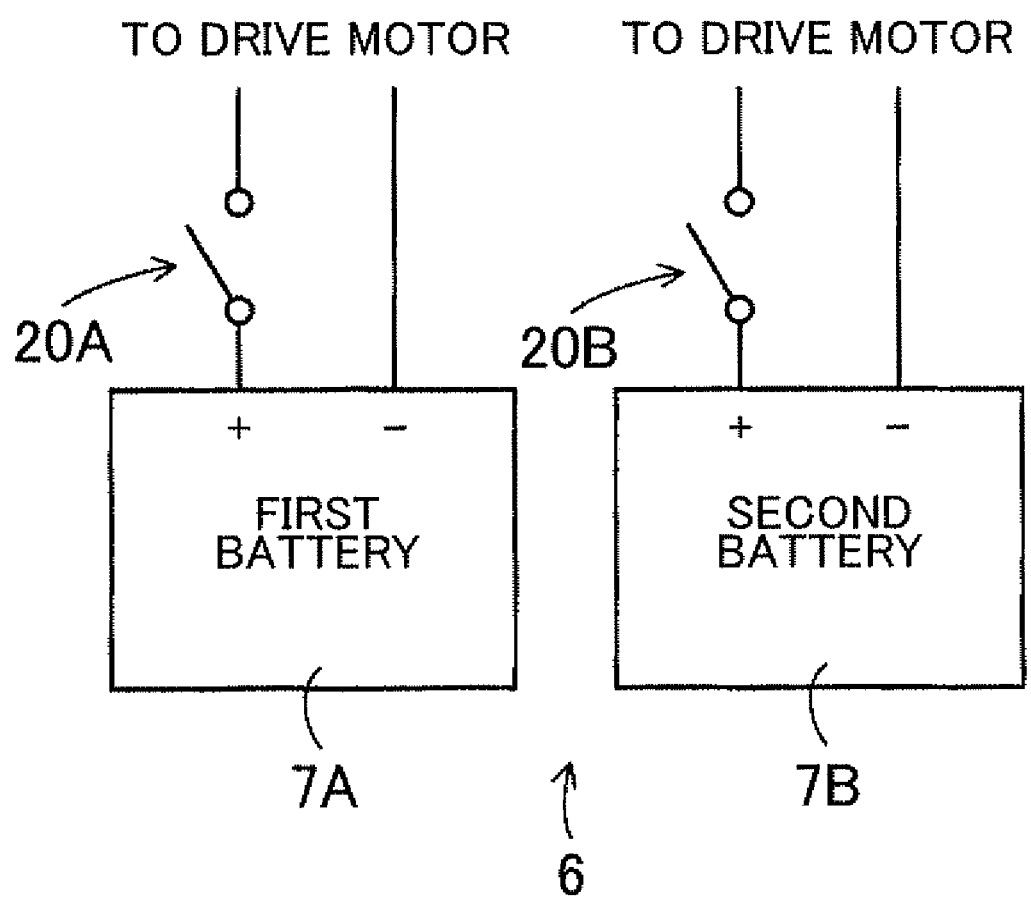
FIG. 2 is a schematic structural diagram of a battery unit used in the embodiment of FIG. 1.

Embodiments of a travel guidance system according to the present invention will now be described in detail with reference to the accompanying drawings. First structure of a vehicle control system 3 of a vehicle 2 having a navigation system 1 according to the present invention as an on-board device will be described with reference to FIG. 1 and FIG. 3. FIG. 1 is a schematic structural diagram of the vehicle control system 3 according to the present invention, and FIG. 2 is a block diagram schematically showing the vehicle control system 3 according to this embodiment. The vehicle according to this embodiment has a plurality of batteries which can be used as a power supply for a drive motor, and may be an electric vehicle using only a motor as the drive or a hybrid vehicle using a motor and an engine in combination as the drive, but in the embodiment described below an electronic vehicle is used.

As shown in FIG. 1 and FIG. 2, the vehicle control system 3 according to this embodiment is basically made up of the navigation system 1 installed in the vehicle 2, a drive motor 5, a battery unit 6 having a plurality of batteries (there are two in this embodiment, a first battery 7A and a second battery 7B), a vehicle control ECU 9, a driver motor control ECU 10, and a battery control ECU 11.

The navigation system 1 has a liquid crystal display 15 mounted in a center console or a panel facing the cabin of the vehicle 2 to display a map of the area (vicinity) around the vehicle and a guidance route to a destination, a speaker 16 for outputting an audio route guidance, etc. The navigation system 1 identifies the current location of the vehicle 2 by using the Global Positioning System (GPS) or the like, and when a destination is set, executes a route search to the destination and outputs guidance along a set (guidance) route using the liquid crystal display 15 and/or the speaker 16. Further, in the navigation system 1 according to this embodiment, when amounts of energy in the first battery 7A and the second battery 7B for travel to the destination set in the navigation system 1 are insufficient as will be described later, the driver is notified of a charging facility suitable for charging the first battery 7A and the second battery 7B by use of the liquid crystal display 15 and/or the speaker 16, as will be described in more detail below.

The drive motor 5 is a motor which operates on power supplied from the first battery 7A or the second battery 7B to drive the vehicle 2. In other words, the drive motor 5 is driven by power supplied from the first battery 7A or the second battery 7B, and outputs drive torque. The generated torque is output to drive wheels 18 via a gear unit 17, such as a differential gear, thereby propelling the vehicle 2.

Furthermore, when braking is needed or the vehicle is stopped by braking, the drive motor 5 functions as a regenerative brake to convert vehicle inertial energy into electric energy.

The battery unit 6 includes a plurality of batteries (two in this embodiment: the first battery 7A and the second battery 7B) and a switch unit which switches power output between the batteries 7A, 7B. Here, the first battery 7A and the second battery 7B are each a secondary battery as a storage unit capable of repeatedly charging and discharging, e.g. a lead-acid battery, a nickel-cadmium battery, a nickel-hydrogen battery, a lithium ion battery, or a sodium-sulfur battery.

The switch unit is a unit which switches the supply of power to the drive motor 5 between the first battery 7A and the second battery 7B, and is shown in FIG. 2 as changeover switches 20A, 20B. When the changeover switch 20A is in an ON state and the changeover switch 20B is in an OFF state, only the first battery 7A serves as the source of power supplied to the drive motor 5. On the other hand, when the changeover switch 20B is in the ON state and the changeover switch 20A is in the OFF state, only the second battery 7B becomes the power supply for the drive motor 5. The changeover switches 20A, 20B are controlled by the battery control ECU 11 so that when the SOC value (state of charge—remaining amount of energy of the battery) of the battery that is currently serving as the power supply (the first battery 7A for example) becomes substantially zero, the power supply source is switched to the other battery (the second battery 7B for example).

Further, the battery unit 6 is connected to a charge connector 19 provided on a side wall of the vehicle 2. By connecting the charge connector 19 to a power supply source such as a wall socket at home or in a charging facility, the first battery 7A and the second battery 7B can be charged. Moreover, the first battery 7A and the second battery 7B are also charged by regenerated power from the drive motor or power generated in a generator. Further, the first battery 7A and the second battery 7B included in the battery unit 6 are each independently removable from the vehicle 2.

The vehicle control ECU (electronic control unit) 9 is an electronic control unit providing overall control of the entire vehicle 2. The drive motor control ECU 10 for controlling the drive motor 5 and the battery control ECU 11 for controlling the batteries 7A, 7B are connected to the vehicle control ECU 9, which is also connected to a navigation ECU 33 included in the navigation system 1.

The vehicle control ECU 9 includes a CPU 21, which serves as an arithmetic unit as well as a control unit, and internal storage devices such as a RAM 22, used as a working memory when the CPU 21 performs various arithmetic routines and a ROM 23 storing a control program and the like.

Further, the drive motor control ECU 10 and the battery control ECU 11 are each made up of a CPU, a RAM, a ROM, and so on which are not shown, and control the drive motor 5 and the battery unit 6, respectively.

Figure 3:
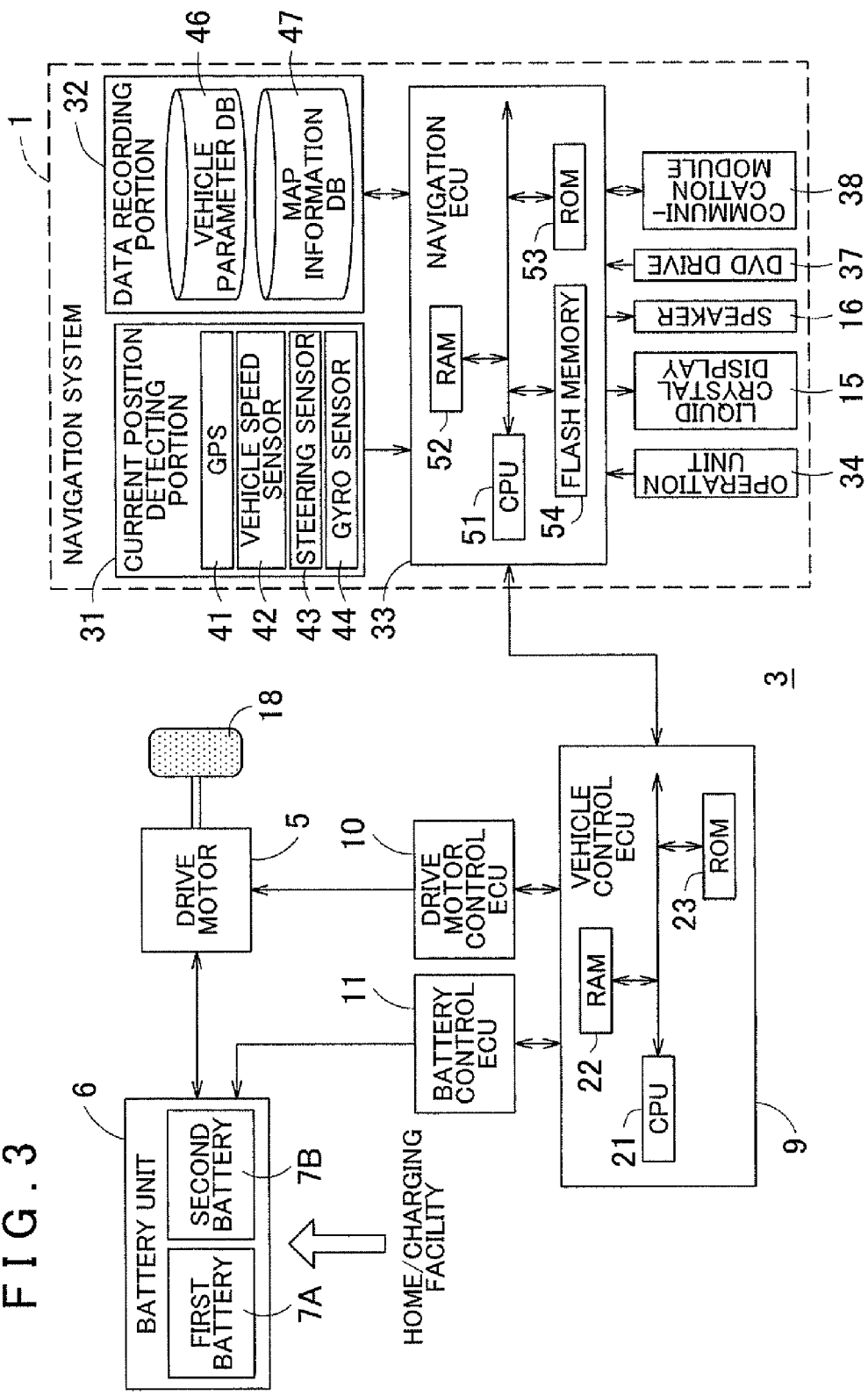
FIG. 3 is a more detailed block diagram of the vehicle control system used in the embodiment of FIG. 1.

Next, the structure of the navigation system 1 will be described with reference to FIG. 3. As shown in FIG. 3, the navigation system 1 according to this embodiment includes a current location detecting portion 31 for detecting the current location of the vehicle 2, a data recording portion 32 for recording various data, and a navigation ECU 33. A CPU 51 within the navigation ECU 33 is programmed to serve as a travel start location obtaining unit, a destination obtaining unit, a charging facility candidate location obtaining unit, a remaining charge amount calculating unit, a facility selecting unit, a charging facility notification unit, a round-trip usable energy amount estimating unit, a round-trip required energy amount estimating unit, a required energy amount estimating unit, a battery remaining charge amount determining unit, and a route search unit by execution of various arithmetic routines based on inputted information. The navigation system 1 further includes an operation unit 34 for input by operation of the user, a liquid crystal display 15 displaying a map around the vehicle and communicating information for charging facilities to the user, a speaker 16 outputting audio route guidance and communication of information for charging facilities, a DVD drive 37 for reading a DVD serving as a recording medium storing a program, and a communication module 38 for communication with an information center such as a probe center or a VICS center.

The components forming the navigation system 1 will be described below in order.

The current location detecting portion 31 includes a GPS 41, a vehicle speed sensor 42, a steering sensor 43, a gyro sensor 44, and so on, and is capable of detecting the current location and direction of the vehicle 2, the traveling speed of the vehicle 2, the current time, and so on. The vehicle speed sensor 42 is for detecting the distance traveled and the speed of the vehicle 2. The vehicle speed sensor 42 generates pulses for the revolution of the drive wheels of the vehicle 2, and outputs a pulse signal to the navigation ECU 33. The navigation ECU 33 then counts the generated pulses to calculate the rotational speed of the drive wheels and the traveled distance. It is not necessary for the navigation system 1 to have all the above five types of sensors. The navigation system 1 may include only one or more of the above five types of sensors.

Further, the data recording portion 32 includes a hard disk (not shown) as an external storage device and as a recording medium, and a recording head (not shown) that is a driver for reading a vehicle parameter DB 46, a map information DB 47, a predetermined program or the like recorded on the hard disk and for writing predetermined data on the hard disk.

Here, the vehicle parameter DB 46 is a database (DB) storing various parameters related to the vehicle 2. Specifically, this DB stores a frontal projected area A $[m^2]$, the drive mechanism inertial weight Wr [kN], the vehicle weight M [kg], the rolling resistance coefficient μr of the drive wheels, an air resistance coefficient μl, a cornering resistance Rc [kN], and so on. The vehicle weight M is stored as separate values for when both the first battery 7A and the second battery 7B are mounted and for when only one of the first battery 7A and the second battery 7B is mounted. The vehicle parameters are used for estimating, by the navigation ECU 33 as will be described later, the energy that will be consumed by the drive motor 5 in travel of the vehicle 2 to the destination or the charging facility.

The vehicle parameter DB 46 also stores the charging rate when the batteries 7A, 7B are charged. In this embodiment, the charging rate is a fixed value irrespective of the location and the type of the charging facility where charging is performed. In addition, the charging rate of each charging facility may be stored in the map information DB 47, which will be described later.

The map information DB 47 stores various map data needed for route guidance, traffic information guidance, and map display. Specifically, the data includes facility data related to facilities such as restaurants and parking lots, link data related to road (link) shapes, node data related to node points, intersection data related to intersections, search data for a route search, search data for a point search, image display data for drawing images of a map, a road, traffic information, and the like on the liquid crystal display 15, and so on. Further, the navigation system 1 according to this embodiment also records charging facility information related to charging facilities. Here, the term "charging facility" refers to a supply facility having dedicated charging equipment for recharging a battery which serves as a power supply source for the drive motor(s), and may be, for example, an automobile charging station, a gas station, or a shopping center containing such a station. Furthermore, at the charging facility, it is possible for a user to leave and request charging of a battery (hereinafter referred to as "charge requesting system"). In this charge requesting system, by leaving at the charging facility that battery with the lowest SOC value among the plurality of batteries provided in the vehicle 2, it is possible to have the left battery charged during the time period that the vehicle 2 goes to the destination and comes back again to the charging facility. Using this charge requesting system, the user need not wait at the charging facility while the battery is charged.

Further, the charging facility information stored in the map information DB 47 includes location coordinates of charging facilities, facility names, operating hours during which the charging facilities are open. Based on the charging facility information, the navigation ECU 33 selects the charging facility that is suitable for leaving the first battery 7A and the second battery 7B, as will be described later.

The navigation ECU (Electronic Control Unit) 33 serves as an electronic control unit for overall control of the entire navigation system 1, and this control includes guidance route setting processing to set, when the destination is selected, a guidance route from a travel start location to a destination, and charging facility candidate search processing to search for charging facilities, which are located along an outbound route and a homeward route from the travel start location to the destination of the vehicle and back, and where it is possible for the user to stop by while traveling on the outward route and the homeward route, and to leave and request charging of one of the batteries 7A, 7B (hereinafter referred to as charging facility candidates), when the amounts of energy (charge) in the first battery 7A and the second battery 7B are insufficient for traveling to the destination set in the navigation system 1. The control also includes charging facility selection processing to select the charging facility or facilities suitable for leaving and requesting charging of the first battery 7A or the second battery 7B from among the detected charging facility candidates, charging facility introduction processing for communicating information on the selected charging facility to the user using the liquid crystal display 15, etc. The navigation ECU 33 includes a CPU 51 serving as an arithmetic processing unit as well as a control unit, and internal storage devices such as a RAM 52 that is used as a working memory when the CPU 51 executes various arithmetic routines, and that stores route data and so on when a route is searched for, a ROM 53 storing a control program, a charging facility introduction processing program (see FIG. 6 to FIG. 8), and so on, and a flash memory 54 storing a program read from the ROM 53.

The operation unit 34 is operated when inputting the travel start location as a guidance start point and the destination as a guidance end point, or the like, and is made up of plural operation switches (not shown) such as various keys, and buttons. The navigation ECU 33 performs, based on switch signals output by pressing the various switches or the like, control of various corresponding operations. The operation unit 34 may also be a touch panel provided on a front face of the liquid crystal display 15.

The liquid crystal display 15 displays a map image including roads, traffic information, operation guidance, an operation menu, key guidance, a guidance route from the current location to the destination, guidance information along the guidance route, news, weather forecasts, time, e-mails, television programs, and/or the like. The liquid crystal display 15 also displays information for a selected charging facility suitable for charging the first battery 7A or the second battery 7B of the vehicle 2.

Further, the speaker 16 outputs an audio guidance for guiding travel along a guidance route and/or traffic information guidance based on instructions from the navigation ECU 33. The speaker 16 also outputs notification of the charging facility selected as suitable for charging the first battery 7A or the second battery 7B of the vehicle 2.

Further, the DVD drive 37 is a drive capable of reading data recorded on a recording medium such as a DVD or a CD. An update of the map information DB 47 or the like is performed based on read data.

The communication module 38 is a communication device for receiving traffic information including traffic jam information, restriction information, parking information, traffic accident information, and so on, transmitted from a traffic information center, for example, a Vehicle Information and Communication System center (VICS (registered trademark)), or a probe center. Also, a cellular phone or a DCM may serve as the communication module 38. In this embodiment, it is also possible to obtain charging facility information from an external information center via the communication module 38.

Figure 4:
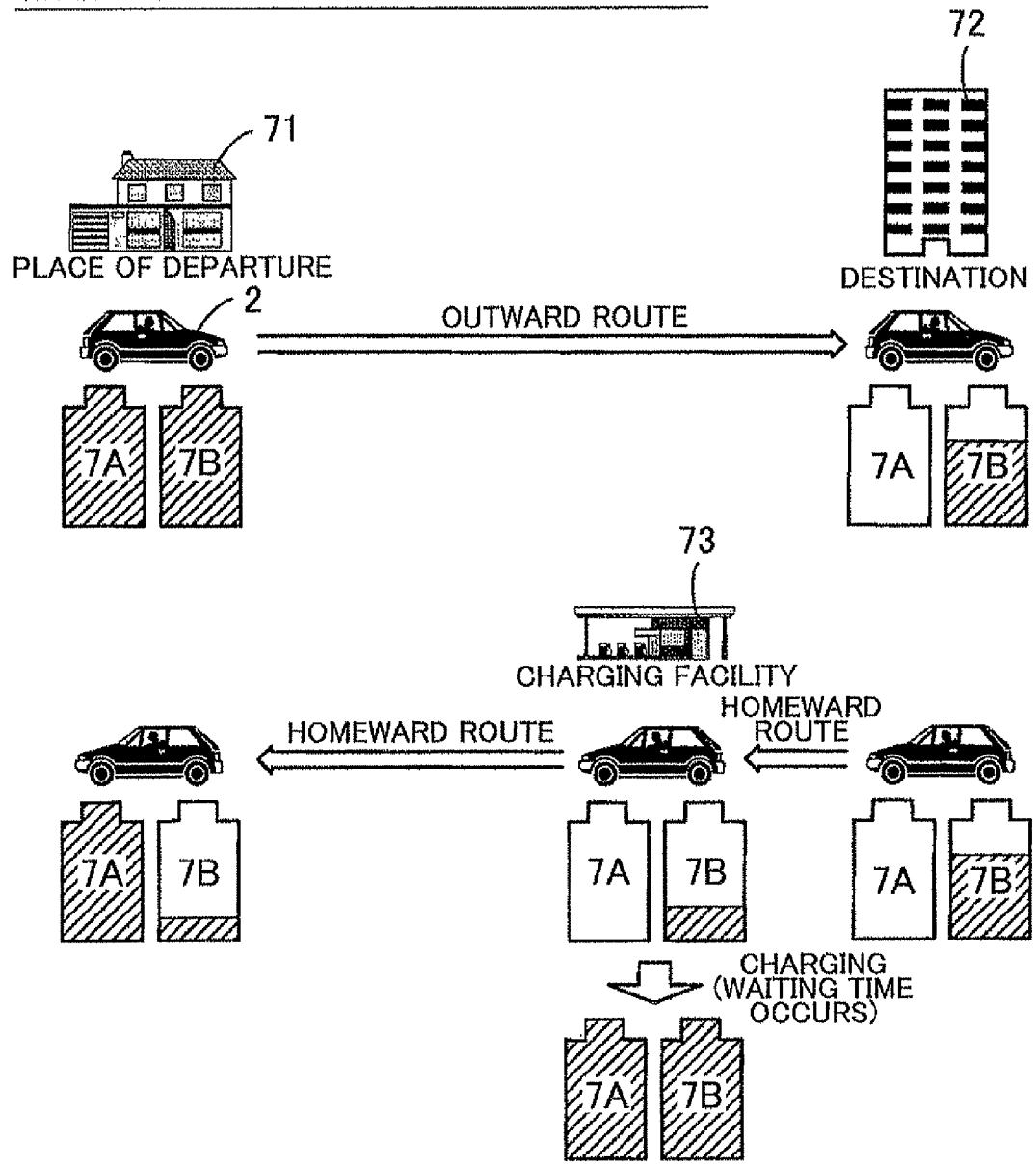
FIG. 4 is a diagram describing vehicle operation using a conventional charging system.

Next, the charge requesting system will be described referring to FIG. 4 and FIG. 5. Here, FIG. 4 and FIG. 5 both describe a situation wherein the amount of energy is insufficient for traveling a round trip route from a place of departure 71 to the destination 72 and back even when the first battery 7A and the second battery 7B are both in a fully charged state.

First, the case where the charge requesting system is not used in the above situation will be described referring to FIG. 4. When the charge requesting system is not used, it is necessary to stop at the charging facility either while traveling on an outbound route to the destination 72 or while traveling on a homeward route from the destination 72, so as to charge the batteries 7A, 7B. As shown in FIG. 4, when the vehicle 2 stops at the charging facility 73 located on a travel route while traveling homeward for charging the batteries, the user has to wait at the charging facility 73 while charging the batteries 7A, 7B.

Next, the case where the charge requesting system is used will be described with reference to FIG. 5. When the charge requesting system is used, the user (driver) needs to stop at the charging facility along the outbound route to the destination 72 so as to leave and request charging of the first battery 7A or the second battery 7B, and thereafter the user needs to stop at the same charging facility while traveling homeward from the destination 72 so as to pick up the first battery 7A or the second battery 7B which had been left.

Figure 5:
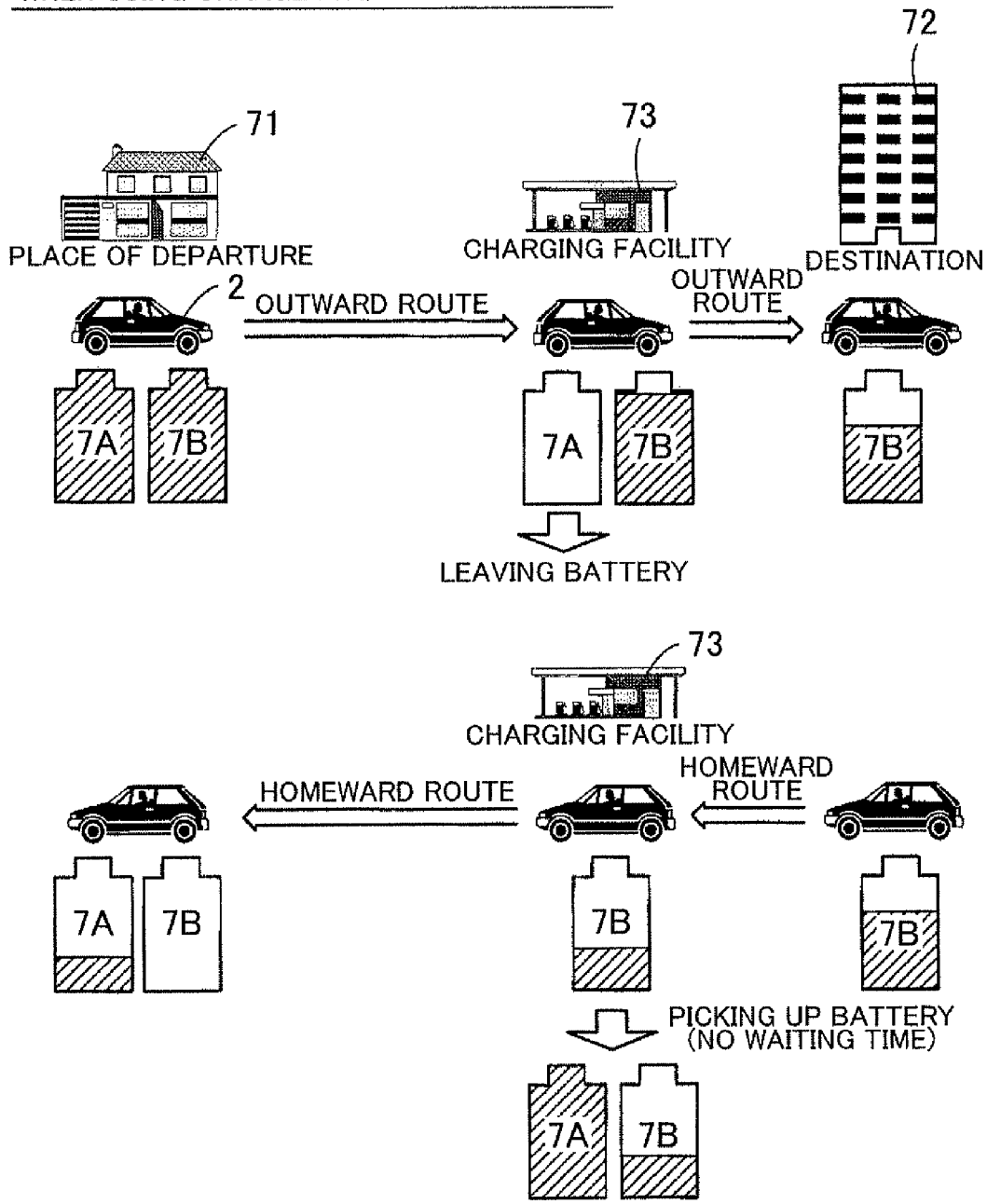
FIG. 5 is a diagram describing vehicle operation using a charge requesting system according to the embodiment of FIGS. 1-3.

For example, it is assumed that, as shown in FIG. 5, the vehicle 2 stops at the charging facility 73 along the outward route in travel toward the destination so as to leave and request charging of the first battery 7A with a substantially zero SOC value at this time. The vehicle 2 can continue traveling while the first battery 7A is charged at the charging facility 73. Then, by stopping by at the charging facility 73 again while traveling on the homeward route to pick up the first battery 7A which has now been charged and mounting the battery on the vehicle 2, the vehicle is able to travel from the place of departure to the destination without waiting at the charging facility 73.

Figure 6:
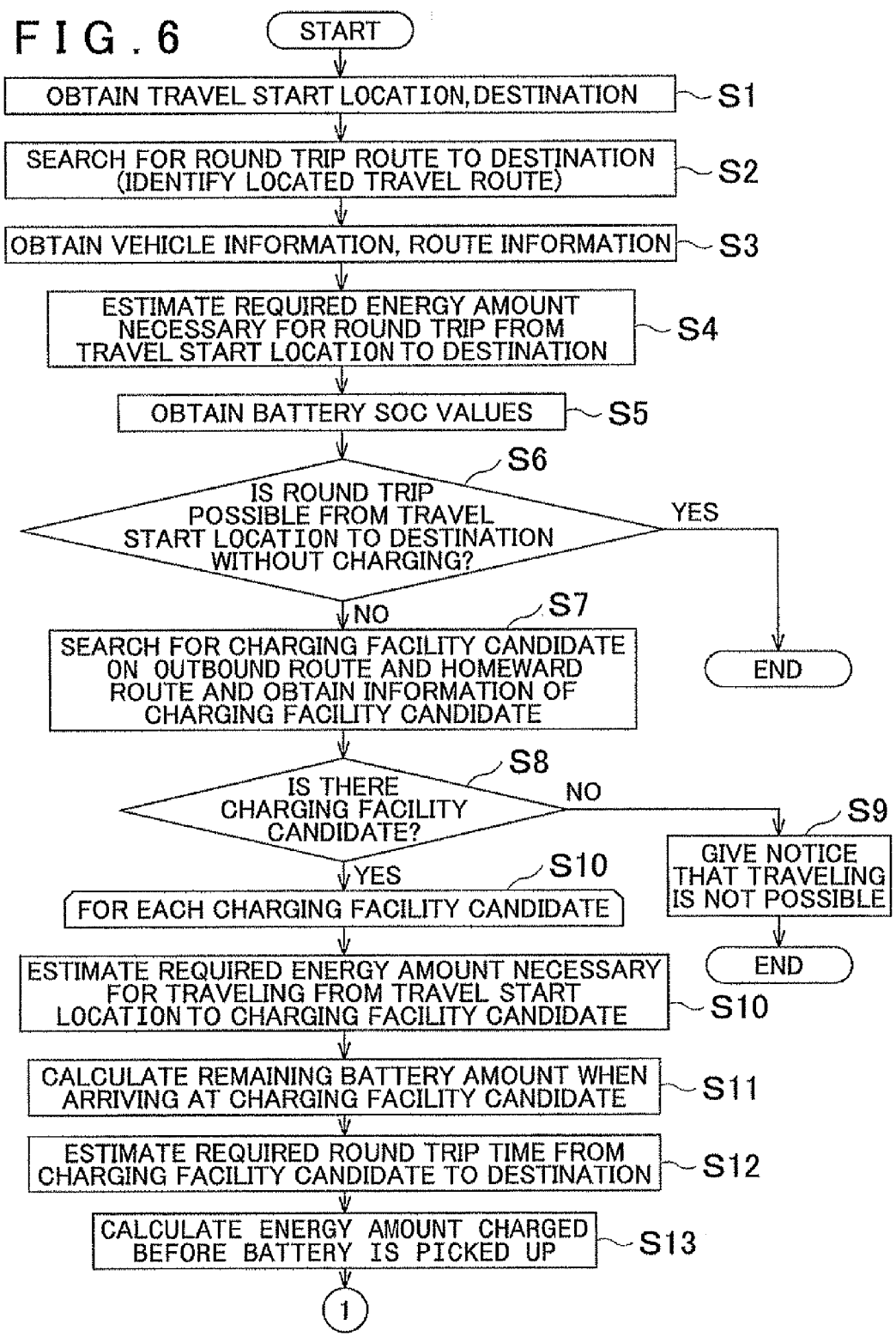
FIG. 6 is a flowchart of an embodiment of a process for notifying a driver of a suitable charging facility according to the present invention.
Figure 7:
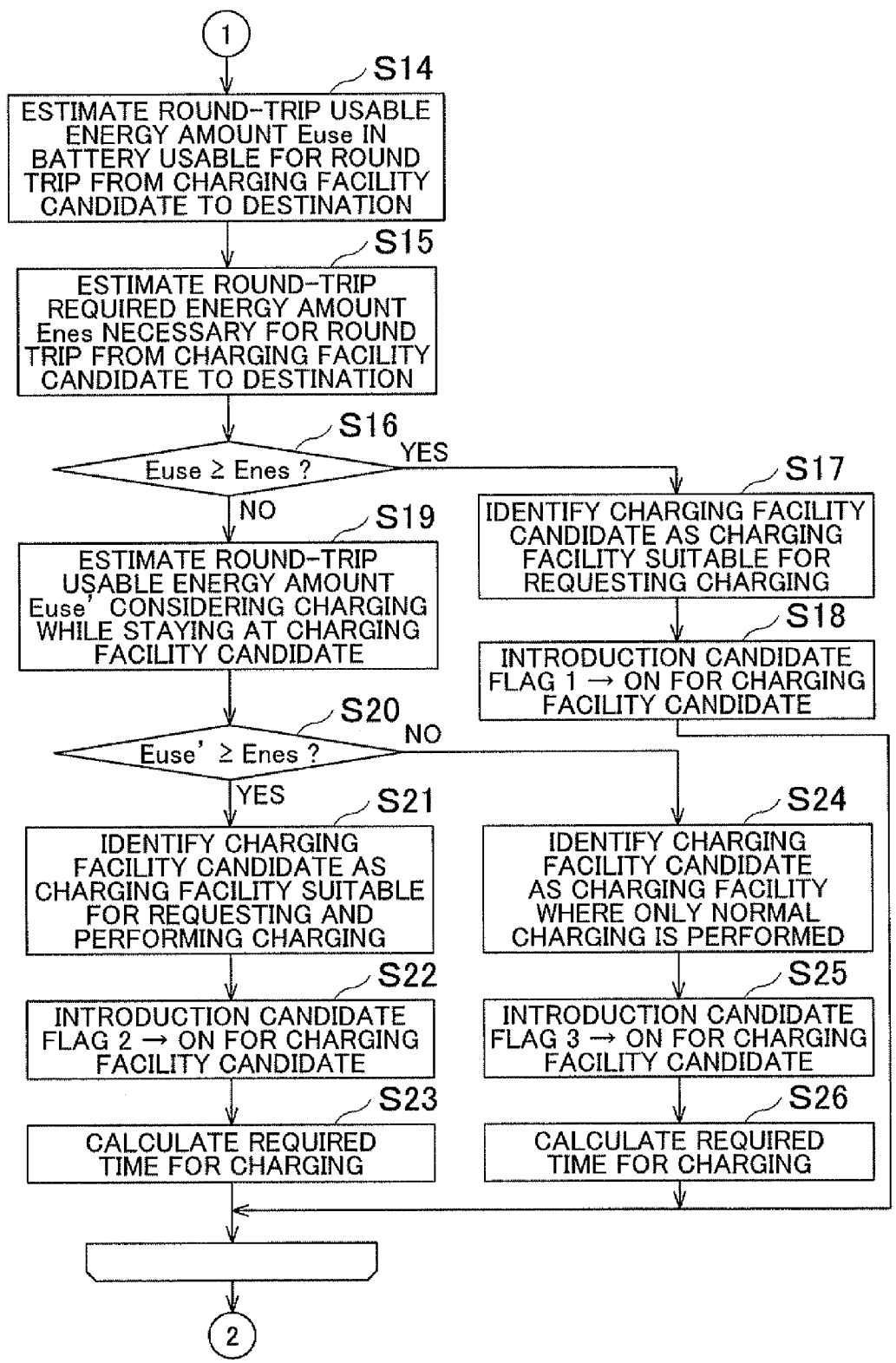
FIG. 7 is a continuation of the flowchart of FIG. 6.
Figure 8:
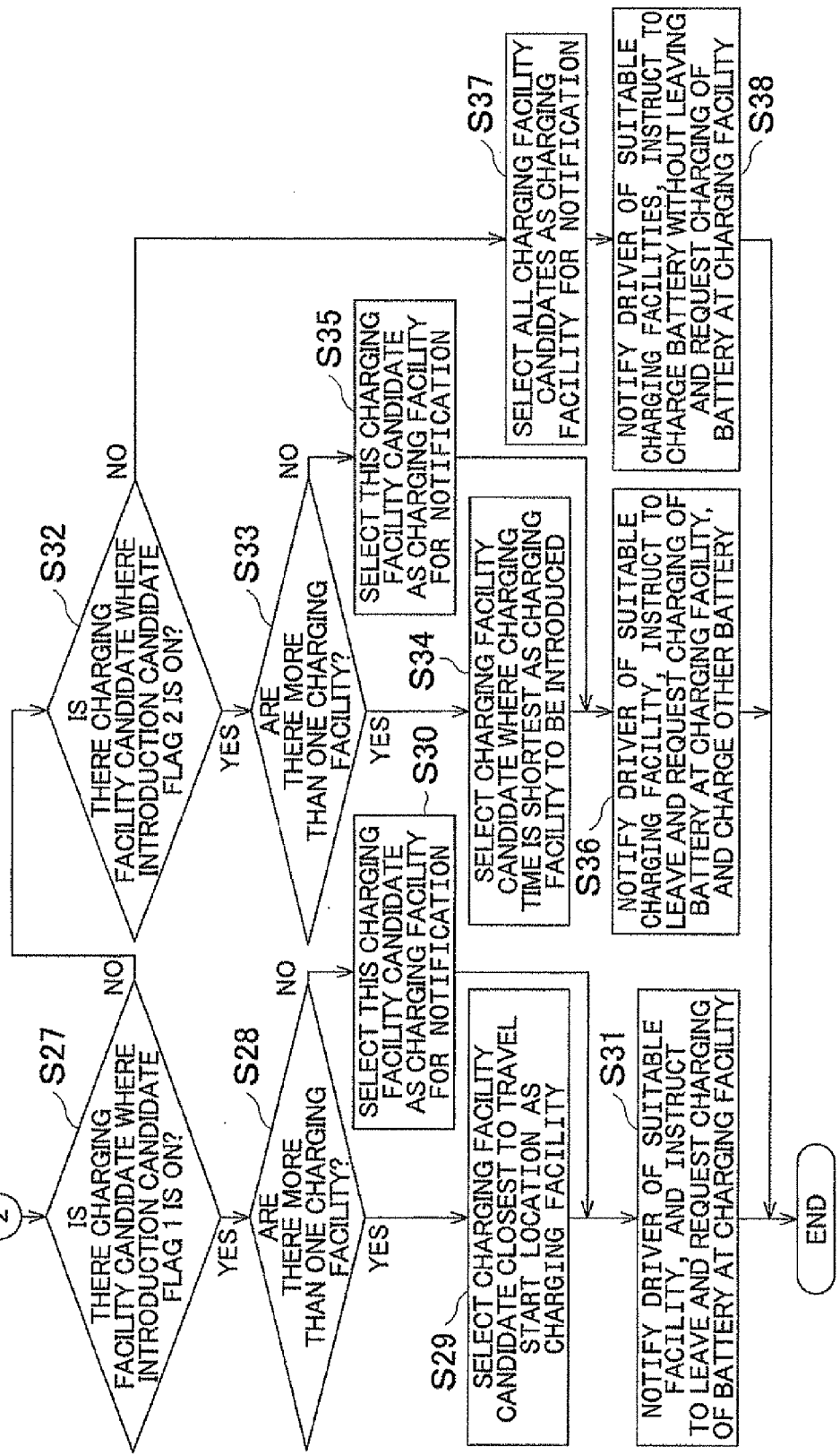
FIG. 8 is a continuation of the flowchart of FIG. 6.

Next, a charging facility notification program executed by the CPU 51 of the navigation ECU 33 in the navigation system 1 will be described based on FIG. 6 to FIG. 8 which are flowcharts of the charging facility notification program according to this embodiment. Execution of the charging facility notification program is started when the destination is set in the navigation system 1 and serves to notify the driver of a charging facility suitable for charging the first battery 7A or the second battery 7B when the amounts of energy in the first battery 7A and the second battery 7B are insufficient for traveling from the travel start location to the destination set in the navigation system 1. The program illustrated by the flowcharts of FIG. 6 to FIG. 8 is stored in the RAM 52 or the ROM 53 provided in the navigation system 1, and is executed by the CPU 51.

In the charging facility notification program, first, in step S1, the CPU 51 obtains the travel start location and the destination of the vehicle 2. In this embodiment, it is assumed that the travel start location is the current location of the vehicle 2. Therefore, the CPU 51 obtains the current location of the vehicle 2 by the current location detecting unit 31. Map matching is used to locate the obtained current location of the vehicle 2 on the map. The destination is that destination currently set in the navigation system 1, and the CPU 51 obtains the destination of the vehicle by reading the information related to the currently set destination from the RAM 52. Thus, in execution of S1, the CPU 51 functions as a travel start location obtaining unit and a destination obtaining unit, i.e. means for obtaining a travel start location and means for obtaining a destination.

Next, in S2, the CPU 51 searches for an outward route from the travel start location (current location of the vehicle 2) to the destination and a homeward route from the destination to the travel start location based on the link data and node data stored in the map information DB 47, the traffic information (traffic jam, traffic restriction, and so on) obtained from the VICS center, and the like. Then the CPU 51 identifies a guidance route made up of the outward route and the homeward route based on results of the route search. The route search is performed using the known Dijkstra's algorithm. In addition, the outbound route and the homeward route may be different routes. Thus, in execution of S2, the CPU 51 functions as a route search unit, i.e. means for searching for a route from the obtained travel start location to the obtained destination.

Subsequently in S3, the CPU 51 reads the vehicle parameter DB 46 and obtains various parameter information related to the vehicle 2. Specifically, the CPU 51 obtains the frontal projected area A $[m^2]$, the drive mechanism inertial weight Wr [kN], the vehicle weight M [kg], the rolling resistance coefficient μr of drive wheels, the air resistance coefficient μl, the cornering resistance Rc [kN], and so on. The vehicle weight M is obtained both for when both the first battery 7A and the second battery 7B are mounted and for when only one of the first battery 7A and the second battery 7B is mounted.

Furthermore, in S3 the CPU 51 obtains route information for the entire travel (guidance) route identified in S2. Here, the route information to be obtained includes information related to intersections (including information related to locations, presence of traffic signals, and the number of lanes) located on the travel route, information related to inclines (including information related to inclination angle (gradient or the like)), information related to curves (including information related to start points, end points, and turning radii), traffic jam (congestion) information (start points of traffic jam, traffic jam lengths, degrees of traffic congestion, and average vehicle speeds of respective links forming the guidance route), and so on. These types of route information are obtained by reading from the map information DB 47, or communicating with the probe center or the VICS center via the communication module 38.

Further, in S4, the CPU 51 estimates the amount of energy that will be required for driving the drive motor 5 (hereinafter referred to as a required energy amount) in travel of the route identified in S2. Here, it is generally known that the energy to be consumed in the drive source (drive motor 5 in this embodiment) in travel of the vehicle depends on various travel resistance forces on the vehicle such as air resistance Rl, rolling resistance Rr, gradient resistance Ri, acceleration resistance Ro, and so on. Here, energy consumptions Eo, Er, El, Ei of the drive motor 5 based on the respective travel resisting forces Ro, Rr, Rl, Ri are calculated based on the vehicle information and the route information for the travel route obtained in S3. A specific method of calculating the energy consumptions Eo, Er, El, Ei is already known, and thus detailed description is omitted. Further, for the vehicle weight, the weight when both the first battery 7A and the second battery 7B are mounted is used.

The total required amount of energy $E_n$ required for driving the drive motor 5 in travel on the set (guidance) travel route is expressed by the following equation (1), taking into account the amount of regenerated energy Ere of the regenerated energy that is estimated to be regenerated and stored in the battery 7 while traveling on the set travel route.

$$E_n = Eo + Er + El + Ei - Ere \qquad (1)$$

The amount of regenerated energy Ere is calculated considering downhill roads and points (intersections, curves, traffic jam areas) where braking is expected, which are located on the set travel route, based on the route information for the set travel route obtained in S3.

In S5, the CPU 51 obtains the SOC values of the first battery 7A and the second battery 7B mounted in the vehicle 2 from the battery control ECU 11.

In S6, the CPU 51 determines whether or not it is possible to make a round trip from the travel start location to the destination without recharging the batteries 7A, 7B at the charging facility on the way, by comparing the SOC values obtained in S5 with the required energy amount estimated in S4. Specifically, it is determined that it is possible to make a round trip from the travel start location to the destination, without charging the batteries 7A, 7B at a charging facility on the way, when the sum of the SOC values of the first battery 7A and the second battery 7B is equal to or more than the required energy amount estimated in S4.

When it is determined that it is possible to make a round trip from the travel start location to the destination without charging the batteries 7A, 7B at the charging facility on the way, as a result of the determination in S6 (S6: YES), the charging facility introduction processing program is finished without selection of a charging facility. On the other hand, when it is determined that it is not possible to make a round trip from the travel start location to the destination without recharging the batteries 7A, 7B in a charging facility on the way (S6: NO), the process proceeds to S7.

In S7, based on the map information DB 47, the CPU 51 searches for charging facilities which are located along the outbound route and the homeward route on the travel route identified in S2 Then the CPU 51 identifies all the charging facilities detected as a result of searching as charging facility candidates where a battery can be left for recharging. Furthermore, various information (location information and the like) related to the identified charging facility candidates are obtained from the map information DB 47. In executing the above-described S7, the CPU 51 serves as a charging facility candidate location obtaining unit, i.e. means for obtaining location information for at least one charging facility candidate.

In addition, those charging facilities corresponding to the "charging facilities located along the outbound route and the homeward route" are facilities facing both a link forming the outbound route and a link forming the homeward route, facilities within a predetermined distance of such links, or the like.

In S8, the CPU 51 determines whether or not there is at least one or more charging facility candidates based on the search results obtained in S7. When it is determined that there is one or more charging facility candidates (S8: YES), the CPU 51 proceeds to S10. On the other hand, when it is determined that no charging facility candidate exists (S8: NO), that is, it is determined that no charging facility exists on the scheduled travel route (or "guidance route"), the CPU 51 proceeds to S9.

In S9, using the liquid crystal display 15 and/or the speaker 16, the CPU 51 gives notice that there is no charging facility where the batteries 7A, 7B can be recharged and that a round trip to the destination is not possible. Further, the CPU 51 may suggest a change of destination or carrying a spare battery. Moreover, when the first battery 7A and the second battery 7B are currently not fully charged, the CPU 51 may suggest charging the batteries before starting travel. Thereafter, the charging facility notification program is finished.

The execution of S10 to S26 as described below targets each of all the charging facility candidates detected in S7. Specifically, the charging facility candidates are each successively processed in order, beginning with the charging facility candidate that is closest to the travel start location, by execution of S10 to S26 for each charging facility candidate.

In S10, first the CPU 51 estimates the required energy amount which is required for travel from the travel start location to a (targeted) charging facility candidate. The estimation method of the required energy amount is the same as in S4 and hence is omitted. In executing S10, the CPU serves as a required energy amount estimating unit, i.e. means for estimating the amount of energy (charge) required for travel from the travel start location to a targeted charging facility candidate.

Next, in S11, the CPU 51 calculates values for SOC which will remain in the first battery 7A and the second battery 7B upon arrival at the targeted charging facility candidate based on the SOC values obtained in S5 and the required energy amount estimated in S10. In executing S11, the CPU 51 serves as a remaining amount calculating unit, i.e. means for calculating the amount of energy (charge) which will remain in the on-board batteries when the vehicle arrives at the charging facility candidate.

Thereafter, in S12 the CPU 51 estimates a required round-trip time that is necessary for making a round trip from the targeted charging facility candidate to the destination and back to the targeted charging facility candidate. Specifically, there is estimated, as the required round-trip time, the total for the respective average travel times for each of the individual links forming the scheduled travel route and a scheduled time of stay at the destination. The average travel times are obtained from the map information DB 47.

Next, in S13, the CPU 51 estimates the amount of energy which can be charged from the time the first battery 7A or the second battery 7B is left at the targeted charging facility candidate until that battery is picked up ("chargeable energy amount"). Specifically, the estimated chargeable energy amount is taken as the smaller of a first value obtained by multiplying the charge rate (Wh/hour) in the charging facility by the required round-trip time estimated in S12 and a second value obtained by subtracting the SOC value when the battery is left at the charging facility candidate from the maximum capacity of the left battery (in the case that the first and second values are the same, that same value is taken as the estimated value). In this embodiment, the charging rate is a fixed value irrespective of the location and the type of the charging facility where charging is performed, and the CPU 51 obtains the value of the charging rate by reading from the vehicle parameter DB 46. On the other hand, when the charging rate differs depending on the location and the type of the charging facility, the CPU 51 obtains the charging rate of each facility.

Subsequently, in S14, the CPU 51 estimates a round-trip usable energy amount $E_{use}$ which will be available for use by the drive motor 5 while making a round trip from the targeted charging facility candidate to the destination and back to the charging facility if the first battery 7A or the second battery 7B is left at the targeted charging facility candidate. Specifically, the estimated round-trip usable energy amount $E_{use}$ is taken as the smaller of "a first value obtained by adding the chargeable energy amount estimated in S13 to the total of the SOC values of the first battery 7A and the second battery 7B estimated for the time of arrival at the targeted charging facility candidate, and subtracting from that sum the amount of energy required for travel of the homeward route from the targeted charging facility candidate to the travel start location and a second value which is the SOC estimated for the battery that is not to be left upon arrival at the targeted charging facility candidate on the outward route (in the case that the first and second values are the same, that same value is taken as the estimated value). The method of estimating the amount of energy required for travel of the homeward route from the charging facility candidate to the travel start location is the same as in above-described S4 and hence is omitted. In executing S14, the CPU 51 serves as a round-trip usable energy amount estimating unit, i.e. means for estimating an amount of energy available for use by the drive source if at least one of the on-board batteries is left at the targeted facility candidate for recharging in travel toward the destination and picked up in travel from the destination back toward the travel start location.

In S14, the round-trip usable energy amount $E_{use}$ is calculated taking into consideration the amount of energy required for travel back to the travel start location after one of the batteries 7A, 7B is picked up at the targeted charging facility candidate. Therefore, when the estimated round-trip usable energy amount $E_{use}$ is greater than the estimated round-trip required energy amount $E_{nes}$, (described below), it is possible to complete a round trip from the travel start location to the destination and back to the travel start location.

In S15, the CPU 51 estimates the round-trip required energy amount $E_{nes}$ that is necessary for making a round trip from the targeted charging facility candidate to the destination and back to the targeted charging facility. The method of estimating the round-trip required energy amount $E_{nes}$ is the same as in the above-described S4 and hence is omitted. However, when calculating the round-trip required energy amount $E_{nes}$ in S15, the vehicle weight is taken as the weight when only the battery which is not left at the targeted charging facility candidate remains mounted in the vehicle. In executing S15, the computer 51 serves as a round-trip required energy amount estimating unit, i.e. means for estimating the amount of energy required for travel from the targeted charging facility candidate to the destination and back to the targeted charging facility candidate.

Next, in S16, the CPU 51 determines whether or not the round-trip usable energy amount $E_{use}$ is equal to or more than the round-trip required energy amount $E_{nes}$ by comparing the round-trip usable energy amount $E_{use}$ estimated in S14 with the round-trip required energy amount $E_{nes}$ estimated in S15.

When it is determined that the round-trip usable energy amount $E_{use}$ is equal to or more than the round-trip required energy amount $E_{nes}$ as a result of determination S16 (S16: YES), the CPU 51 proceeds to S17. On the other hand, when it is determined that the round-trip usable energy amount $E_{use}$ is smaller than the round-trip required energy amount $E_{nes}$ (S16: NO), the CPU 51 proceeds to S19.

In S17, the CPU 51 identifies the charging facility candidate as one of the charging facilities suitable for leaving a battery to be recharged. In executing steps S16 and S17, the CPU 51 functions as a charging facility selecting unit, i.e. means for selecting a suitable charging facility candidate by determining that the round-trip useable energy amount is equal to or larger than the round-trip required energy amount Then in S18, the CPU 51 sets a candidate flag 1 to ON for the charging facility candidate. The candidate flag 1, a candidate flag 2 and a candidate flag 3, which will be described later, are stored in the RAM 52.

Where the candidate flag 1 is turned ON for the targeted charging facility candidate in S18, that ON flag indicates that travel from the travel start location to the destination and back is possible if one of the batteries 7A, 7B is left for recharging at the charging facility while traveling on the outbound route to the destination and picked up and remounted in the vehicle on the homeward route from the destination, without any charging other than the recharging at the charging facility.

An example satisfying the above condition will now be described referring to FIG. 9 and FIG. 10. In the following example, the capacities of the first battery 7A and the second battery 7B are the same, and the SOC when fully charged is 1.0 for each of the batteries.

Figure 9:
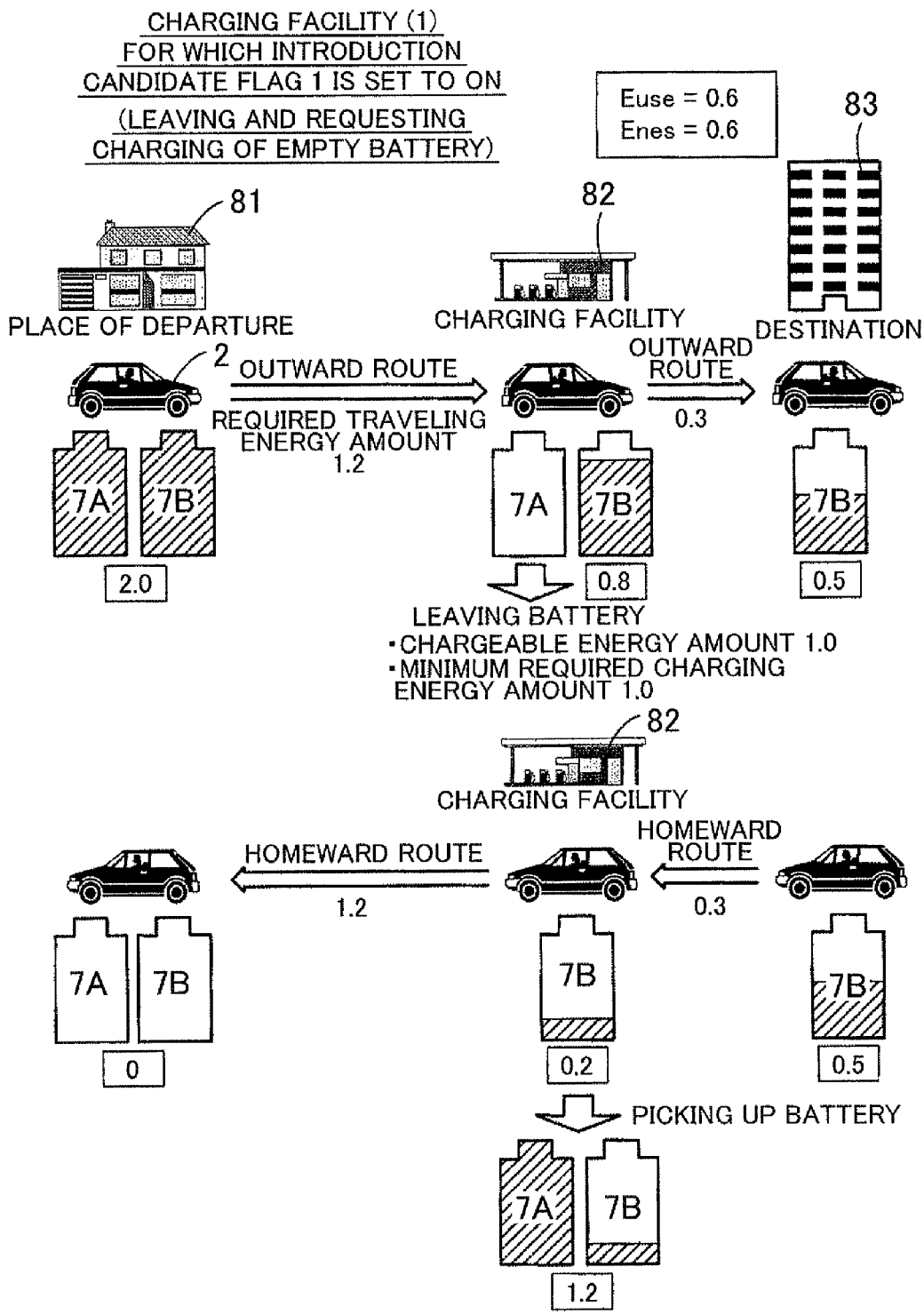

In the example shown in FIG. 9, the SOC total value of the batteries 7A, 7B before start of travel is 2.0. The required amount of energy for travel from a place of departure 81 to a charging facility candidate 82 is 1.2. The required amount of energy for travel from the charging facility candidate 82 to the destination 83 is 0.3. The amount of energy that can be charged from the time the first battery 7A is left at the charging facility candidate 82 until the first battery 7A is picked up is 1.0. In the situation shown in FIG. 9, the round-trip usable energy amount $E_{use}$ estimated in S14 is 0.6. Further, the round-trip required energy amount $E_{nes}$ estimated in above-described S15 is 0.6 (that is, S16: YES).

Therefore, the vehicle 2 becomes capable of making a round trip from the place of departure 81 to the destination 83 and back by leaving the first battery 7A with an SOC value of substantially zero at the charging facility candidate 82 for recharging to an SOC of 1.0, without any other charging of the battery other than at the charging facility. In the example shown in FIG. 9, the targeted charging facility candidate is identified as a charging facility suitable for the vehicle 2 to leave and request charging of one of the batteries 7A, 7B only.

Figure 10:
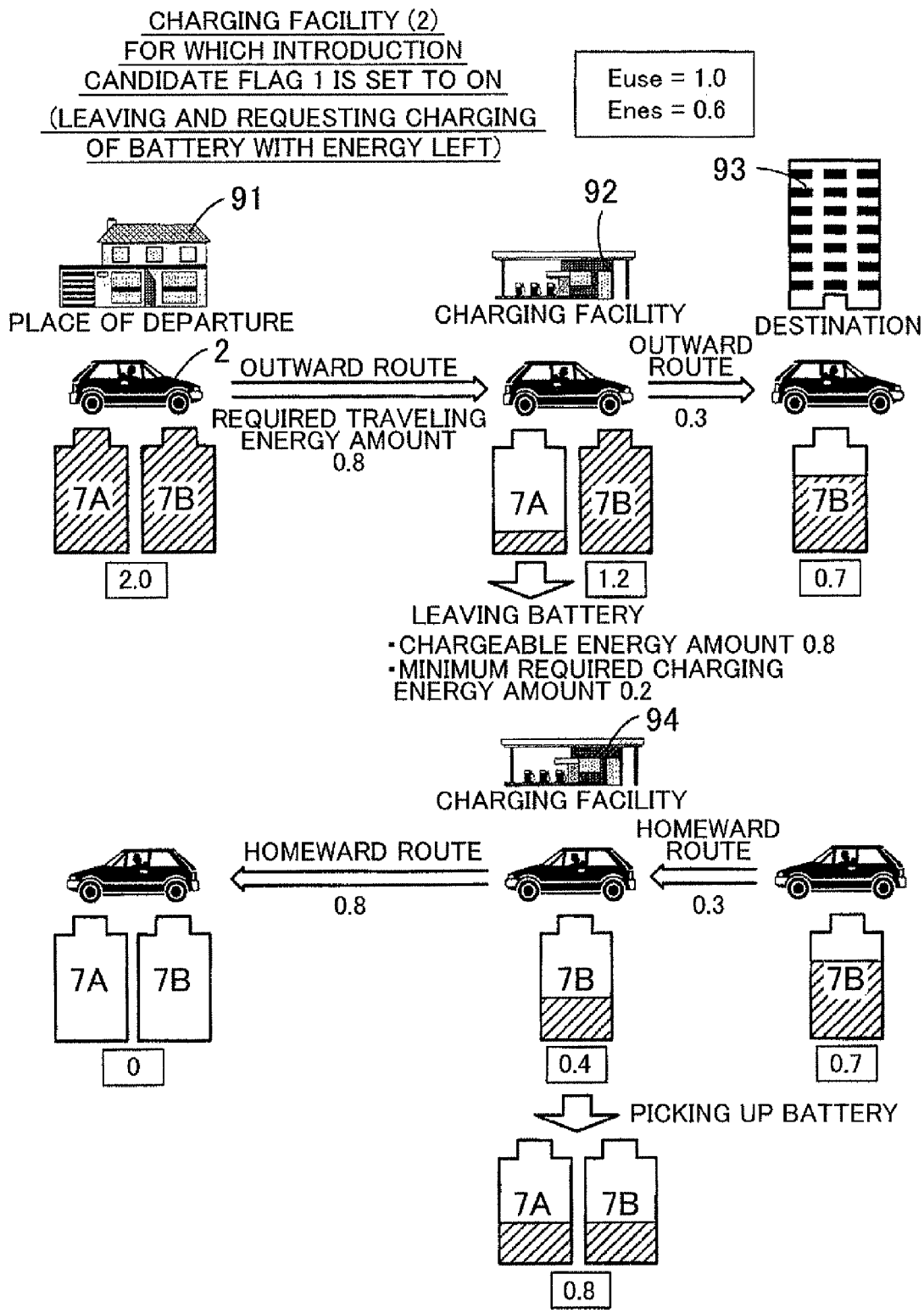

In the example shown in FIG. 10, the total SOC value for both the batteries 7A, 7B before starting travel is 2.0. The amount of energy required for travel from a place of departure 91 to a targeted charging facility candidate 92 is 0.8. The amount of energy required for travel from the charging facility candidate 92 to the destination 93 is 0.3. The amount of energy that can be charged from the time the first battery 7A is left at the charging facility candidate 92 until the first battery 7A is picked up is 0.8. In the example shown in FIG. 10, the round-trip usable energy amount $E_{use}$ estimated in S14 is 1.0. Further, the round-trip required energy amount $E_{nes}$ estimated in S15 is 0.6 (that is, S16: YES).

Therefore, the vehicle 2 becomes capable of making a round trip from the place of departure 91 to the destination 93 and back by leaving the first battery 7A with an SOC value of 0.2 at the charging facility candidate 92 for recharging in the amount of 0.2 or more, without any other charging. In FIG. 10, only 0.2 is the minimum required amount of energy to be charged. As above, in the example shown in FIG. 10, the targeted charging facility candidate 92 is identified as a charging facility suitable leaving one (only) of the batteries 7A, 7B for recharging.

In S19, the CPU 51 newly estimates a round-trip usable energy amount $E_{use}'$ assuming that the vehicle will stay at the targeted charging facility candidate while one battery is recharged in this charging facility and the other battery is left for recharging. Specifically, the CPU 51 calculates the round-trip usable energy amount $E_{use}'$ by calculating the difference between the maximum capacity and the SOC value predicted for one battery upon arrival of the vehicle at the targeted charging facility candidate where the one battery will be recharged while waiting (not left), and adding that calculated difference to the round-trip usable energy amount $E_{use}$ estimated in S14.

Next, in S20, the CPU 51 compares the round-trip usable energy amount $E_{use}'$ estimated in S19 with the round-trip required energy amount $E_{nes}$ estimated in S15, so as to determine whether or not the round-trip usable energy amount $E_{nes}'$ is equal to or larger than the round-trip required energy amount $E_{nes}$.

When it is determined that the round-trip usable energy amount $E_{use}'$ is equal to or larger than the round-trip required energy amount $E_{nes}$ estimated in S15 (S20: YES), due to the vehicle remaining at the targeted charging facility candidate while one battery (which is not the battery to be left) is recharged in this charging facility, the CPU 51 proceeds to S21. On the other hand, when it is determined that the round-trip usable energy amount $E_{use}'$ is lower than the round-trip required energy amount $E_{nes}$ (S20: NO) estimated in S15, even when a vehicle battery is charged while waiting at the charging facility, the CPU 51 proceeds to S24.

In S21, the CPU 51 identifies the targeted charging facility candidate as one of the charging facilities suitable for the vehicle 2 waiting for one battery to be recharged and for leaving another battery to be recharged. In S22, the CPU 51 then sets the candidate flag 2 to ON for the targeted charging facility candidate.

Where the candidate flag 2 is set to ON for the targeted charging facility candidate in S22, return travel to the travel start location from that charging facility is possible by charging the battery which is not to be left, and leaving the other battery at this charging facility for recharging while traveling on the route to the destination, and by picking up and remounting in the vehicle the battery which has been left at this charging facility while traveling homeward from the destination.

Thereafter, in S23, the CPU 51 calculates a necessary charging time for charging the battery which is not to be left at the targeted charging facility candidate. Specifically, the CPU 51 calculates a necessary charging time for charging the battery with the amount of energy found to be the deficiency in comparing the round-trip usable energy amount $E_{use}$ estimated in S14 with the round-trip required energy amount $E_{nes}$ estimated in S15. The calculated charging time is stored in the RAM 52 or the like.

Figure 11:
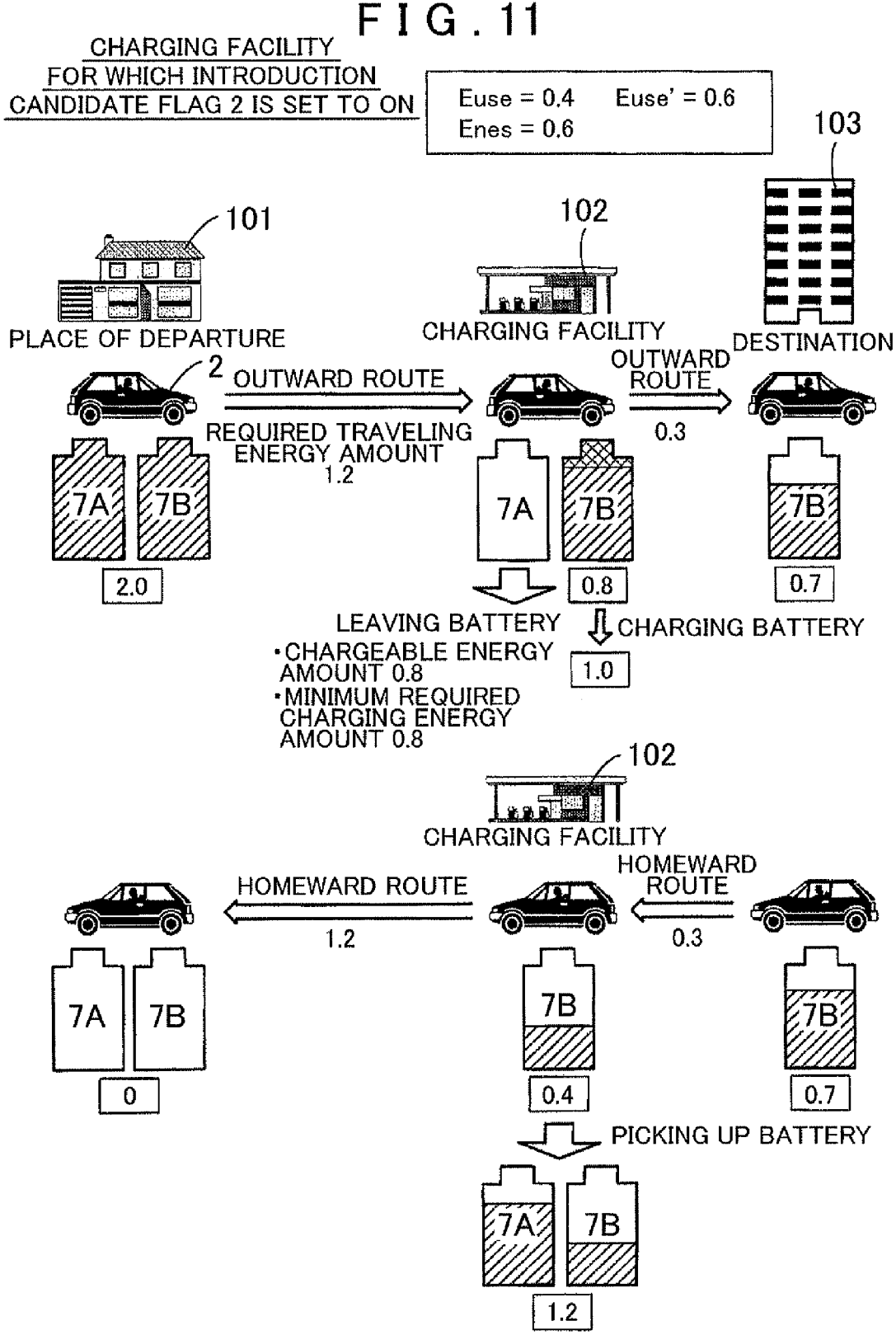

Here, an example of the foregoing will be described with FIG. 11. In the example shown in FIG. 11, the total SOC value of both batteries 7A, 7B before starting travel is 2.0. The amount of energy required for travel from a place of departure 101 to a targeted charging facility candidate 102 is 1.2. The amount of energy required for travel from the charging facility candidate 102 to the destination 103 is 0.3. The chargeable energy amount that can be charged between the time the first battery 7A is left at the charging facility candidate 102 until it is picked up is 0.8. In the situation shown in FIG. 11, the round-trip usable energy amount $E_{use}$ estimated in S14 is 0.4.

Further, the round-trip required energy amount $E_{nes}$ is 0.6 (that is, S16: NO). Here, the second battery 7B is charged at the charging facility candidate 102 for the charging time calculated in S23, and as a result the second battery 7B is newly charged with 0.2. Thus, the round-trip usable energy amount $E_{use}'$ becomes 0.6 (that is, S20: YES).

Therefore, the vehicle 2 becomes capable of making a round trip from the place of departure 101 to the destination 103 by charging the second battery 7B with an additional 0.2 to give a SOC of 1.0 (100% or fully charged) and leaving the first battery 7A with an SOC value of substantially zero with request for charging thereof to 0.8 SOC at the charging facility candidate 102. As above, in the example shown in FIG. 11, the targeted charging facility candidate 102 is identified as the charging facility suitable for the vehicle 2 to leave and request charging of one of the batteries 7A, 7B and also to stay and obtain normal battery charging.

On the other hand, in S24, the CPU 51 identifies the targeted charging facility candidate as unsuitable for leaving and requesting charging of one of the batteries 7A, 7B, and where only normal battery charging is obtained. In S25, the CPU 51 then sets the candidate flag 3 to ON for the targeted charging facility candidate.

Subsequently, in S26, the CPU 51 calculates the charging time necessary for charging the batteries 7A, 7B while waiting at the targeted charging facility candidate. Specifically, the CPU 51 calculates the charging time for charging the first battery 7A and the second battery 7B with the amount of energy needed for travel back to the travel start location from this charging facility via the destination. The calculated charging time is stored in the RAM 52 or the like.

Candidate flag 3 set to ON for the targeted charging facility candidate in S25 indicates that, if a battery is left at this charging facility while traveling on the outbound route to the destination, the amount of energy in the remaining battery will be insufficient to complete a round trip to the travel start location.

Figure 12:
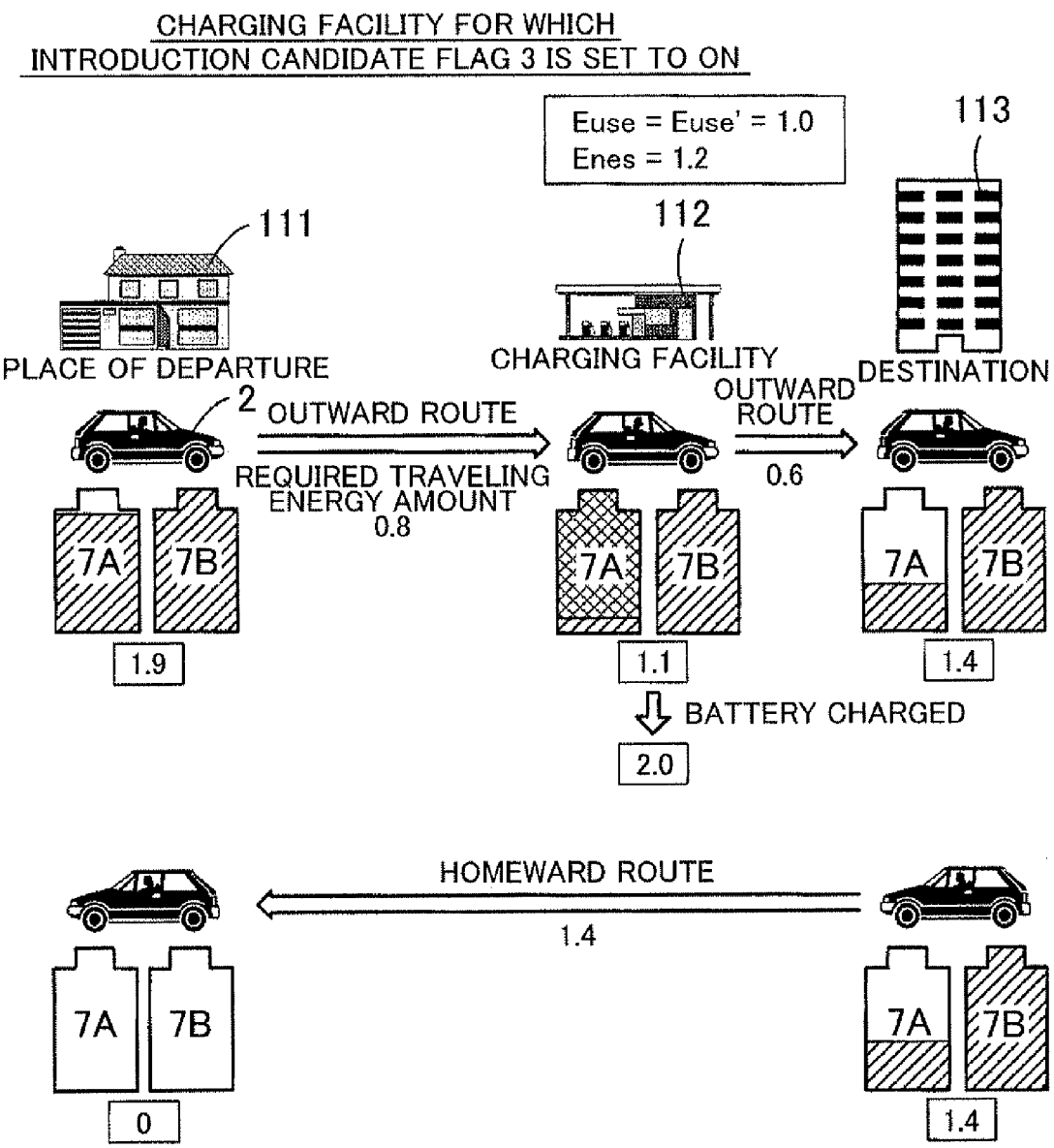

In the example shown in FIG. 12, the total SOC value for the two batteries 7A, 7B before starting travel is 1.9. The amount of energy required for travel from a place of departure 111 to a targeted charging facility candidate 112 is 0.8. The amount of energy required for travel from the charging facility candidate 112 to the destination 113 is 0.6. The chargeable energy amount that can be charged between the time the first battery 7A is left at the charging facility candidate 112 and when it is picked up is 0.9. As shown in FIG. 12, the round-trip usable energy amount $E_{use}$ estimated in S14 is 1.0, which is the maximum capacity of the second battery 7B. Further, the round-trip required energy amount $E_{nes}$ estimated in S15 is 1.2 (that is, S16: NO). Here, the second battery 7B is fully charged when the vehicle 2 arrives at the charging facility candidate 112 and cannot be charged any further, and thus the round-trip usable energy amount $E_{use}'$ is 1.0 (that is, S20: NO).

Therefore, while waiting at the charging facility candidate 112, the first battery 7A of the vehicle 2 is charged for the charging time calculated in S26, and as a result, the first battery 7A is charged with an additional 0.9 to bring it to 1.0 SOC (fully charged). Thus, the vehicle 2 becomes capable of making a round trip from the place of departure 111 to the destination 113. As above, in the example shown in FIG. 12, the targeted charging facility candidate 112 is identified as a charging facility which is not suitable for leaving of one of the batteries 7A, 7B for recharging, and thus only normal battery charging is obtained.

After S10 to S26 are executed for each of the charging facility candidates detected in S7, the CPU 51 then proceeds to S27. On the other hand, when there is any charging facility candidate which has not been so processed, the CPU 51 returns to S10 and executes S10 to S26 for the charging facility candidate which had not been processed.

Then, in S27, the CPU 51 reads the candidate flag 1, the candidate flag 2, and the candidate flag 3 set for each charging facility candidate in S18, S22 and S25 from the RAM 52, The CPU 51 then determines whether or not there is a charging facility candidate for which the candidate flag 1 is set to ON among the charging facility candidates detected in S7.

If, as a result, it is determined that there is a charging facility candidate for which the candidate flag 1 is set to ON (S27: YES), the CPU 51 proceeds to S28. On the other hand, when it is determined that there is no charging facility candidate for which the candidate flag 1 is set to ON (S27: NO), the CPU 51 proceeds to S32.

In S28, the CPU 51 determines whether or not there are more than one charging facility candidate for which the candidate flag 1 is set to ON. When it is determined that there are more than one charging facility candidate for which the candidate flag 1 is set to ON (S28: YES), the charging facility candidate closest to the travel start location is selected as the most suitable charging facility (charging facility to be introduced to the driver, by "introduction" or "notification") for the vehicle 2 to leave and request charging of one (only) of the batteries 7A, 7B (S29). On the other hand, when it is determined that there is only one charging facility candidate for which the candidate flag 1 is set to ON (S28: NO), this charging facility candidate is selected as the charging facility (charging facility to be introduced) that is most suitable for the vehicle 2 to leave and request charging of one of the batteries 7A, 7B (S30).

Figure 13:
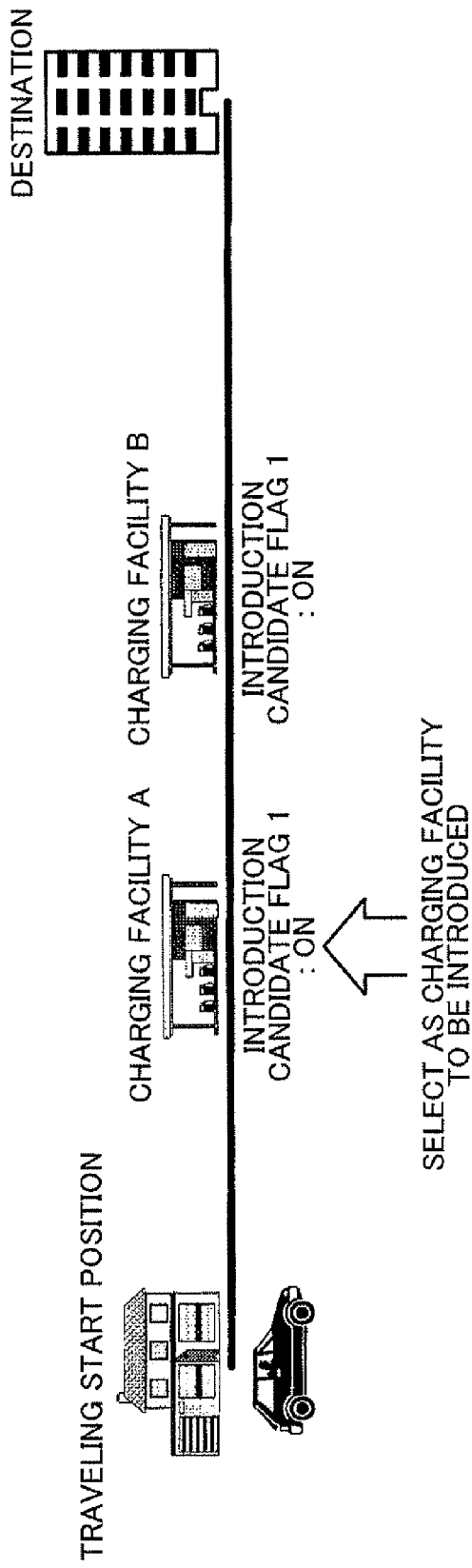
FIG. 13 is a diagram illustrating an example of selection of a charging facility from among plural charging facility candidates.

Therefore, for example as shown in FIG. 13, when a charging facility A and a charging facility 13, which are both charging facility candidates, are located along the outbound route from the travel start location to the destination, with the candidate flag 1 being set to ON for both the charging facility A and the charging facility B, the charging facility A closer to the travel start location is selected as the charging facility for notification (introduction) to the driver. Accordingly, the vehicle can secure a longer charging time. Further, the distance of travel while carrying an unnecessary battery can be reduced.

Further, as shown in FIG. 14, when a charging facility C, a charging facility D, and a charging facility E are among the charging facility candidates located along the outbound route from the travel start location to the destination, with the candidate flag 2 being set to ON for the charging facility C, the candidate flag 1 being set to ON for the charging facility D, and the candidate flag 3 being set to ON for the charging facility E, the charging facility D is selected as the charging facility for notification to the driver.

Next, in S31, the CPU 51 notifies the driver of information (location coordinates of the charging facility, the name of the charging facility, a route from the travel start location to the charging facility, and so on) related to the charging facility selected in S29 or S30, using the liquid crystal display 15 and/or the speaker 16. Specifically, the CPU 51 instructs the user to leave either the first battery 7A or the second battery 7B at the selected charging facility and to request charging thereof. Furthermore, the user is notified of the minimum required amount of charge to be requested (that is, the charging amount for arriving back at the travel start location with the batteries 7A, 7B having a SOC of substantially zero). Execution of the program is thereby finished. In executing S31, the CPU 51 functions as a charging facility notification unit, i.e., means for communicating location information for the selected charging facility to the driver.

In S32, the CPU 51 determines whether or not there is any charging facility candidate for which the candidate flag 2 is set to ON, among the charging facility candidates detected in S7.

When it is determined, as a result, that there is a charging facility candidate for which the candidate flag 2 is set to ON (S32: YES), the CPU 51 proceeds to S33. On the other hand, when it is determined that there is no charging facility candidate for which the candidate flag 2 is set to ON (S32: NO), that is, when there exist only charging facility candidates for which the candidate flag 3 is set to ON, the CPU 51 proceeds to S37.

In S33, the CPU 51 determines whether or not there are more than one charging facility candidate for which the candidate flag 2 is set to ON. When it is determined that there are more than one charging facility candidate for which the candidate flag 2 is set to ON (S33: YES), the charging facility candidate for which the shortest charging time is calculated in S23 is selected as the charging facility that is most suitable for the vehicle 2 to leave and request charging of one of the batteries 7A, 7B and also to wait while obtaining normal battery charging (S34).

On the other hand, when it is determined that there is only one charging facility candidate for which the candidate flag 2 is set to ON (S33: NO), this charging facility candidate is selected as the charging facility that is most suitable for the vehicle 2 to leave and request charging of one of the batteries 7A, 7B and also to wait while obtaining normal battery charging (S35).

Subsequently, in S36, the CPU 51 communicates to the user (driver) information (location coordinates of the charging facility, the name of the charging facility, the charging time, a route from the travel start location to the charging facility, and so on) related to the charging facility selected in S34 or S35 using the liquid crystal display 15 and/or the speaker 16. Specifically, the CPU 51 instructs the user to wait at the selected charging facility while charging the battery that is not to be left there for the charging time calculated in S23 or longer, and to leave and request charging of the other battery. Furthermore, the user is informed of the minimum required amount of charge to be requested, i.e. the amount of charge whereby the SOC of the batteries 7A, 7B will be substantially zero when travel is completed upon return to the travel start location. Execution of the charging facility selection program is now finished.

On the other hand, in S37, the CPU 51 selects all the charging facility candidates determined in S7 to be unsuitable for leaving one of the batteries 7A, 7B for recharging, i.e. as suitable only for normal battery charging.

Subsequently, in S38, the CPU 51 communicates to the driver information (location coordinates of the charging facility, the name of the charging facility, the charging time, a route from the travel start location to the charging facility, and so on) related to the charging facility (selected in S37) using the liquid crystal display 15 and/or the speaker 16. Specifically, the CPU 51 instructs the user to remain at the selected charging facility while charging the first battery 7A and the second battery 7B for the charging time calculated in S26, or longer, without leaving any battery at the selected charging facility. Execution of the charging facility selection program is now finished.

As described in detail above, in the navigation system 1 according to this embodiment, the travel guidance method provided by the navigation system 1 through execution of the charging facility selection program includes: detecting one or more charging facilities on the route from the current location of the vehicle 2 to the destination as charging facility candidates where a battery can be left for recharging (S7) when a destination is set; selecting the charging facility candidate most suitable for leaving a battery for recharging from among the detected charging facility candidates (S29, S30, S34, S35); and communicating information on the selected charging facility to the user (driver) (S31, S36). Thus, by adopting the method of the present invention for leaving and requesting charging of one of the batteries at the charging facility, and informing the user of the most suitable charging facility as a place to leave one of the batteries 7A, 7B, it becomes possible to obtain efficient charging of the batteries 7A, 7B. For example, the waiting time for charging the battery at the charging facility can be reduced.

Further, since the navigation system 1 selects the charging facility candidate where the round-trip usable energy amount, which is usable for making a round trip from the charging facility candidate to the destination and back to the charging facility candidate, is equal to or larger than the round-trip required energy amount as the charging facility suitable for leaving one of the batteries 7A, 7B, it becomes possible to inform the user of the charging facility that makes it possible to complete round-trip traveling from the charging facility to the destination and back to the charging facility with only one of the batteries (the battery not left at the charging facility) serving as the power source.

Moreover, since the charging facility is selected from among the charging facilities located along the route from the travel start location to the destination, it is possible to inform the user of the charging facility where one of the batteries 7A, 7B can be left without deviating from the guidance route.

It should be noted that the present invention is not limited to the above embodiment and, as a matter of course, various improvements and modifications can be made without departing from the scope and spirit of the invention. For example, in foregoing embodiment, the present invention is applied to a navigation system provided in an electric vehicle using only a motor as a drive source, but the invention may be applied to a navigation system provided in a plug-in hybrid vehicle which uses a motor and an engine in combination as the drive source. In this latter modification, in the determination of S6, it is determined whether or not travel of the round-trip route from the travel start location to the destination can be completed by what is called EV traveling in which only the drive motor 5 is used as the drive source.

In another embodiment, the CPU 51 selects from among suitable charging facility candidates based on the SOC values for when the vehicle arrives at each charging facility candidate. Specifically, the following steps are executed after S11.

First, based on the SOC values of the first battery 7A and the second battery 7B when the vehicle arrives at the charging facility candidate calculated in S11, the CPU 51 determines whether or not there is any charging facility candidate where the SOC value of either the first battery 7A or the second battery 7B becomes substantially zero at the time of arrival at that charging facility. In executing this step, the CPU 51 functions as a battery amount determining unit, i.e. means for determining if the SOC of one or more on-board batteries will be substantially zero when the vehicle arrives at a targeted charging facility candidate.

When it is determined that there is a charging facility candidate where the SOC value of either the first battery 7A or the second battery 7B will be substantially zero at the time of arrival, the charging facility candidate where the SOC value of either the first battery 7A or the second battery 7B will be substantially zero at the time of arrival and which is closest to the travel start location is selected as the charging facility to which the user is to be directed (notification).

On the other hand, when it is determined that there is no charging facility candidate where the SOC value of either the first battery 7A or the second battery 7B will be substantially zero at the time of arrival, the charging facility candidate where the SOC values of the first battery 7A and the second battery 7B become lowest at the time of arrival is selected as the charging facility for notification. That is, it becomes possible to obtain efficient charging by choosing the on-board battery which is least useful for the vehicle as an on-board battery to be left at the charging facility.

Further, the foregoing embodiment is described as applied to a navigation system provided in a vehicle having two batteries, the first battery 7A and the second battery 7B. However, the invention can also be applied to a navigation system provided in a vehicle having three or more batteries. In this case, it is possible to leave and request charging of two or more batteries at once at one charging facility. Furthermore, it is also possible to leave and request charging of different batteries at respective, plural charging facilities.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A travel guidance system, comprising:
   a travel start location obtaining unit obtaining a travel start location of a vehicle having a plurality of on-board batteries used as a power supply for a drive source;
   a destination obtaining unit obtaining a destination for the vehicle;
   a charging facility candidate location obtaining location information on at least one charging facility candidate where it is possible to leave at least one of the on-board batteries while the vehicle continues to the destination and request charging of the at least one of the on-board batteries;
   a remaining amount calculating unit calculating, for each charging facility candidate, the amount of energy which will remain in the on-board batteries of the vehicle when the vehicle arrives at the charging facility candidate;
   a charging facility selecting unit selecting, from among plural charging facility candidates, a charging facility suitable for the vehicle to leave at least one of the on-board batteries, based on the travel start location of the vehicle, the destination of the vehicle, the location information on each of the charging facility candidates, and the amounts of the remaining energy in the on-board batteries calculated for each charging facility candidate by the remaining amount calculating unit; and
   a charging facility notification unit including at least one of a display and a speaker, said charging facility notification unit communicating the selected charging facility to a driver of the vehicle, wherein:
   the charging facility selecting unit includes:
   a round-trip usable energy amount estimating unit estimating a round-trip usable energy amount available for use by the drive source in travel of the vehicle from the charging facility candidate to the destination and back to the charging facility candidate, if the vehicle leaves at least one of the on-board batteries at the charging facility candidate for recharging in travel toward the destination and then picks up the recharged battery from the charging facility candidate in travel from the destination back to the travel start location; and a round-trip required energy amount estimating unit estimating a round-trip required energy amount for the drive source to generate the drive force for the vehicle when the vehicle makes the round trip from the charging facility candidate to the destination and back t the charging facility candidate, and the charging facility selecting unit selects the charging facility candidate where the round-trip usable energy amount is equal to or larger than the round-trip required energy amount as the charging facility suitable for leaving at least one of the on-board batteries.

2. The travel guidance system according to claim 1, further comprising:

a route search unit searching for determining a route of a round trip from the travel start location to the destination and back to the travel start location, wherein:

the charging facility selecting unit selects a charging facility located on an outbound portion of the determined route as the charging facility candidate.

3. A travel guidance system according to claim 1, wherein: the charging facility selecting unit includes:

a required energy amount estimating unit estimating a required energy amount required for the drive source to generate a drive force for the vehicle to travel from the travel start location to the charging facility candidate; and a battery remaining amount determining unit determining whether or not the remaining amount of energy of at least one of the plurality of on-board batteries will become zero when the vehicle arrives at the charging facility candidate, based on the required energy amount estimated by the required energy amount estimating unit, and the charging facility selecting unit selects the charging facility candidate, for which the battery remaining amount determining unit determines that the remaining energy amount of the at least one on-board battery will become zero upon arrival, as a charging facility suitable for leaving an on-board battery.

4. The travel guidance system according to claim 3, further comprising:

a route search unit searching for determining a route of a round trip from the travel start location to the destination and back to the travel start location, wherein:

the charging facility selecting unit selects a charging facility located on an outbound portion of the determined route as the charging facility candidate.

5. The travel guidance system according to claim 3, further comprising:

a route search unit searching for determining a route of a round trip from the travel start location to the destination and back to the travel start location, wherein:

the charging facility selecting unit selects a charging facility located on an outbound portion of the determined route as the charging facility candidate.

6. A travel guidance system according to claim 1, wherein: the charging facility selecting unit includes:

a required energy amount estimating unit estimating a required energy amount required for the drive source to generate a drive force for the vehicle to travel from the travel start location to the charging facility candidate; and a battery remaining amount determining unit determining whether or not the remaining amount of energy of at least one of the plurality of on-board batteries will become zero when the vehicle arrives at the charging facility candidate, based on the required energy amount estimated by the required energy amount estimating unit, and the charging facility selecting unit selects the charging facility candidate, for which the battery remaining amount determining unit determines that the remaining energy amount of the at least one on-board battery will become zero upon arrival, as a charging facility suitable for leaving an on-board battery.

7. The travel guidance system according to claim 1, further comprising:

a route search unit searching for determining a route of a round trip from the travel start location to the destination and back to the travel start location, wherein:

the charging facility selecting unit selects a charging facility located on an outbound portion of the determined route as the charging facility candidate.

8. A travel guidance method, comprising:

obtaining a travel start location of a vehicle having a plurality of on-board batteries used as a power supply for a drive source;

obtaining a destination for the vehicle;

obtaining location information on at least one charging facility candidate where it is possible to leave at least one of the on-board batteries while the vehicle continues to the destination and request charging of the at least one of the on-board batteries;

calculating remaining energy amounts for the on-board batteries upon arrival of the vehicle at the charging facility candidate;

selecting from among the charging facility candidates, a charging facility suitable for the vehicle to leave at least one of the on-board batteries, based on the travel start location of the vehicle, the destination of the vehicle, the location information for the charging facility candidates, and the calculated remaining energy amounts of the on-board batteries; and using at least one of a display and a speaker to communicate information for the selected charging facility to a user of the vehicle, wherein selecting from among the charging facility candidates includes steps of:

estimating a round-trip usable energy amount available for use by the drive source in travel of the vehicle from the charging facility candidate to the destination and back to the charging facility candidate, if the vehicle leaves at least one of the on-board batteries at the charging facility candidate for recharging in travel toward the destination and then picks up the recharged battery from the charging facility candidate in travel from the destination back to the travel start location; and estimating a round-trip required energy amount for the drive source to generate the drive force for the vehicle when the vehicle makes the round trip from the charging facility candidate to the destination and back t the charging facility candidate, and wherein the charging facility selecting unit selects the charging facility candidate where the round-trip usable energy amount is equal to or larger than the round-trip required energy amount as the charging facility suitable for leaving at least one of the on-board batteries.

9. A non-transitory computer-readable medium having, encoded thereon, a computer program causing the computer to perform functions of:

obtaining a travel start location of a vehicle having a plurality of on-board batteries used as a power supply for a drive source;

obtaining a destination for the vehicle;

obtaining location information on at least one charging facility candidate where it is possible to leave at least one of the on-board batteries while the vehicle continues to the destination and request charging of the at least one of the on-board batteries;

calculating remaining energy amounts for the on-board batteries upon arrival of the vehicle at the charging facility candidate;

selecting from among the charging facility candidates, a charging facility suitable for the vehicle to leave at least one of the on-board batteries, based on the travel start location of the vehicle, the destination of the vehicle, the location information for the charging facility candidates, and the calculated remaining energy amounts of the on-board batteries; and using at least one of a display and a speaker to communicate information for the selected charging facility to a user of the vehicle, wherein selecting from among the charging facility candidates includes steps of:

estimating a round-trip usable energy amount available for use by the drive source in travel of the vehicle from the charging facility candidate to the destination and back to the charging facility candidate, if the vehicle leaves at least one of the on-board batteries at the charging facility candidate for recharging in travel toward the destination and then picks up the recharged battery from the charging facility candidate in travel from the destination back to the travel start location; and estimating a round-trip required energy amount for the drive source to generate the drive force for the vehicle when the vehicle makes the round trip from the charging facility candidate to the destination and back t the charging facility candidate, and wherein the charging facility selecting unit selects the charging facility candidate where the round-trip usable energy amount is equal to or larger than the round-trip required energy amount as the charging facility suitable for leaving at least one of the on-board batteries.

* * * * *